United States Patent
Senba

(10) Patent No.: US 10,041,694 B2
(45) Date of Patent: Aug. 7, 2018

(54) AIR CONDITIONING MANAGEMENT SYSTEM

(71) Applicant: DAIKIN INDUSTRIES, LTD., Osaka-shi, Osaka (JP)

(72) Inventor: Kazuhito Senba, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 305 days.

(21) Appl. No.: 14/411,364

(22) PCT Filed: May 7, 2013

(86) PCT No.: PCT/JP2013/062844
§ 371 (c)(1),
(2) Date: Dec. 24, 2014

(87) PCT Pub. No.: WO2014/006972
PCT Pub. Date: Jan. 9, 2014

(65) Prior Publication Data
US 2015/0142176 A1    May 21, 2015

(30) Foreign Application Priority Data
Jul. 6, 2012  (JP) .................................. 2012-152272

(51) Int. Cl.
F24F 11/62     (2018.01)
F24F 11/00     (2018.01)
(Continued)

(52) U.S. Cl.
CPC .......... F24F 11/0009 (2013.01); F24F 11/30 (2018.01); F24F 11/62 (2018.01);
(Continued)

(58) Field of Classification Search
None
See application file for complete search history.

(56) References Cited

U.S. PATENT DOCUMENTS 5,592,824 A * 1/1997 Sogabe .................... F24F 11/00
                                                                  236/51
6,108,614 A * 8/2000 Lincoln .................. F24F 11/006
                                                                 340/3.1
(Continued)

FOREIGN PATENT DOCUMENTS

EP    0 647 820 A1    4/1995
EP    2 239 519 A1    10/2010
(Continued)

OTHER PUBLICATIONS

European Search Report of corresponding EP Application No. 13 81 3722.9 dated Jun. 23, 2016.
(Continued)

*Primary Examiner* — Thomas J Dailey
(74) *Attorney, Agent, or Firm* — Global IP Counselors, LLP

(57) ABSTRACT

An air conditioning management system manages air conditioning units having unique physical addresses using logical addresses. The system includes a local controller collecting driving information for the air conditioning units, and an operating unit for each air conditioning unit. The local controller has a memory section which stores identification information for each of the air conditioning units, an information collecting section which collects the driving information, and an associating section which associates the driving information with the logical addresses. The identification information for each of the air conditioning units has a physical address section, a real address section set from the operating unit, and a temporary address section arbitrarily settable without the operating unit. The associating section uses the real address as the logical address when the real address is set and uses the temporary address as the logical address when the real address is not set.

17 Claims, 16 Drawing Sheets

(51) Int. Cl.
  *G05B 15/02* (2006.01)
  *F24F 11/30* (2018.01)
  *F24F 11/54* (2018.01)
  *F24F 11/56* (2018.01)

(52) U.S. Cl.
  CPC .............. *G05B 15/02* (2013.01); *F24F 11/54* (2018.01); *F24F 11/56* (2018.01); *G05B 2219/2614* (2013.01); *G05B 2219/2642* (2013.01)

(56) References Cited

U.S. PATENT DOCUMENTS

| | | | | |
|---|---|---|---|---|
| 6,125,640 | A * | 10/2000 | Kim | F24F 3/065 62/175 |
| 6,622,501 | B2 * | 9/2003 | Seong | F24F 11/62 62/175 |
| 8,063,745 | B2 * | 11/2011 | Miyaba | F24F 11/0086 340/10.2 |
| 8,733,119 | B2 * | 5/2014 | Higuma | F24F 1/0003 62/298 |
| 2004/0204793 | A1 * | 10/2004 | Yoon | F24F 11/006 700/277 |
| 2005/0174998 | A1 * | 8/2005 | Vesterinen | H04L 29/12216 370/354 |
| 2006/0212175 | A1 * | 9/2006 | Kim | H04L 12/282 700/277 |
| 2009/0139251 | A1 * | 6/2009 | Masui | F24F 11/0009 62/129 |

FOREIGN PATENT DOCUMENTS

| | | |
|---|---|---|
| JP | 2000-74461 A | 3/2000 |
| WO | 2009/005113 A1 | 1/2009 |

OTHER PUBLICATIONS

International Preliminary Report of corresponding PCT Application No. PCT/JP2013/062844 dated Jan. 6, 2015.
International Search Report of corresponding PCT Application No. PCT/JP2013/062844 dated Jul. 23, 2013.

* cited by examiner

FIG. 11

AIR CONDITIONING MANAGEMENT SYSTEM

CROSS-REFERENCE TO RELATED APPLICATIONS

This U.S. National stage application claims priority under 35 U.S.C. § 119(a) to Japanese Patent Application No. 2012-152272, filed in Japan on Jul. 6, 2012, the entire contents of which are hereby incorporated herein by reference.

TECHNICAL FIELD

The present invention relates to an air conditioning management system.

BACKGROUND ART

In an air conditioning system in the background art where a plurality of indoor units are connected with one outdoor unit, controlling is performed by each of the indoor units being specified by identifying using unique information such as a serial number. For example, a technique is proposed in Japanese Unexamined Patent Application Publication No. 2000-74461 where numbering is set for each of the plurality of indoor units as an address in order of the unique serial numbers which are given when manufacturing the indoor units and which are stored on an EEPROM in each of the indoor units. Here, the EEPROM is a component which is included in a print substrate which is provided in an air conditioning unit such as the indoor unit.

In addition, in the air conditioning system where the plurality of indoor units are operated using one remote control unit, setting of addresses for each of the indoor units from the remote control unit in order to identify each of the indoor units is described in Japanese Unexamined Patent Application Publication No. 2000-74461.

SUMMARY

Problems to be Solved by the Invention

However, in a building such as an office building where a plurality of the air conditioning units are disposed, a means is necessary for identifying each of the plurality of air conditioning units in order to introduce a service where centralized management of a plurality of air conditioning units is provided.

In the technique in Japanese Unexamined Patent Application Publication No. 2000-74461, the serial number changes when the print substrate is replaced due to a breakage or the like and the order of the serial numbers of the plurality of air conditioning units changes due to this. To accompany this, the addresses which are set for each of the air conditioning units also change. In addition, the order of the serial numbers of the plurality of indoor units changes in a case where the indoor unit which is new is added and the addresses which are set for each of the indoor units also change to accompany this. In addition, it is not possible to confirm the serial. numbers to begin with from the outer appearance of the print substrate or the like and it is also difficult to ascertain the addresses which are automatically set based on the serial number. Due to this, it is difficult to ascertain the corresponding relationship between the addresses and each of the indoor units and the burden and cost of management increases.

On the other hand, a method of setting the addresses for each of the air conditioning units manually using an operating means such as a remote control unit is more preferable from the point that it is possible to set the addresses while visually confirming the set units. However, there is a demerit in that it is not possible to set the addresses in a case where the location where the air conditioning units are disposed is off limits to entry due to any circumstances. For example, it is often the case that bank vaults or offices of important people are off limits to entry. A technician who goes out and visits for setting the real addresses needs to goes out and visit again in order to set the addresses of the air conditioning units in locations where it is not possible to gain entry, and the burden and costs of work for introducing the system increase.

The object of the present invention is to provide an air conditioning system where it is possible to reduce the burden and costs of work for introducing the system.

Means to Solve the Problems

An air conditioning management system according to a first aspect of the present invention manages a plurality of air conditioning units, which each have a unique physical address, using logical addresses and is provided with a local controller which collects driving information for each of the air conditioning units and an operating means for each of the air conditioning units with the operating means arranged in the vicinity of each of the air conditioning units. The local controller has a memory section, an information collecting section, and an associating section. The memory section stores identification information for each of the air conditioning units. The information collecting section collects the driving information for each of the air conditioning units. The associating section associates the driving information with the logical addresses. The identification information for each of the air conditioning units has a physical address section which contains the physical address, a real address section which contains a real address, and a temporary address section which contains a temporary address. The real address is set from the operating means. It is possible for the temporary address to be arbitrarily set without the operating means. The associating section uses the real address as the logical address in a case where the real address is set and uses the temporary address as the logical address in a case where the real address is not set. The plurality of air conditioning units include an outdoor unit and an indoor unit which communicate with each other using the physical address.

That is, the air conditioning system according to the present invention manages each of the air conditioning units using the logical addresses separately to the physical addresses. Then, the real address, which is set via the operating means which is a remote control unit or the like, is used as the logical address and the temporary address, which is able to be arbitrarily set without the operating means which is a remote control unit or the like, is used as the logical address in a case where the real address is not set. Due to this, it is possible to manage each of the air conditioning units using the temporary addresses even in a case where the location where the air conditioning units are disposed is off limits to entry during work for introducing the system due to any circumstances and it is not possible to set the real address using the operating means which is a remote control unit or the like. Accordingly, the burden and costs of work for introducing the system such as repeat visits by a technician are reduced.

An air conditioning management system according to a second aspect of the present invention is the air conditioning management system according to the first aspect of the present invention where an offsite controller is further provided. The offsite controller is connected to the local controller via a communication network. The offsite controller has an information receiving section and an offsite management section. The information receiving section receives the driving information from the local controller. The offsite management section manages each of the air conditioning units using the logical addresses.

Due to this, offsite management of the air conditioning units is possible even if the location where the air conditioning units are disposed is off limits to entry and it is not possible to set the real address.

An air conditioning management system according to a third aspect of the present invention is the air conditioning management system according to the first aspect or the second aspect of the present invention where each of the air conditioning units has a communication substrate. The physical address is determined based on the identification information of the communication substrate.

Here, since the physical address is automatically determined based on the identification information of the communication substrate, work for setting the physical address, which is used in communication between the outdoor unit and the indoor unit, is not necessary.

An air conditioning management system according to a fourth aspect of the present invention is the air conditioning management system according to any of the first aspect to the third aspect of the present invention where the real address and the temporary address are information with the same format.

Due to this, it is not necessary to change a program depending on whether either of the real address or the temporary address is used as the logical address.

An air conditioning management system according to a fifth aspect of the present invention is the air conditioning management system according to any of the first aspect to the fourth aspect of the present invention where the real address has a predetermined initial value. The associating section uses the temporary address as the logical address in a case where the real address is the initial value.

Due to this, it is possible to easily identify whether the real address is set or not set.

An air conditioning management system according to a sixth aspect of the present invention is the air conditioning management system according to any of the first aspect to the fifth aspect of the present invention where the local controller further has an address updating section. The address updating section updates only the physical address when the communication substrate is replaced.

Only the physical address is automatically updated when the communication substrate is replaced. Due to this, the burden and costs of management are reduced.

An air conditioning management system according to a seventh aspect of the present invention is the air conditioning management system according to any of the first aspect to the sixth aspect of the present invention where the local controller further has a first temporary address setting reception section which receives setting of the temporary addresses.

Due to this, it is possible to set the temporary address from the local controller even in a case where it is not possible to gain entry into the location where the air conditioning units are disposed. Accordingly, wasteful costs such as repeat visits by a technician are reduced.

An air conditioning management system according to an eighth aspect of the present invention is the air conditioning management system according to any of the first aspect to the seventh aspect of the present invention where a temporary address setting device is further provided. The temporary address setting device has a temporary address setting reception section.

Due to this, it is possible to set the temporary address from the temporary address setting device onsite or offsite through the Internet even if it is not possible to gain entry into the location where the air conditioning units are disposed. Accordingly, wasteful costs such as repeat visits by a technician are reduced.

An air conditioning management system according to a ninth aspect of the present invention is the air conditioning management system according to the eighth aspect of the present invention where the temporary address setting device further has a temporary address setting section. The temporary address setting section sets the temporary addresses based on the physical addresses.

Due to this, it is possible to set the temporary addresses based on the physical addresses for the air conditioning units where the real address is not set and it is possible to reduce the burden of setting the temporary address.

Advantageous Effects of Invention

In the air conditioning management system according to the first aspect of the present invention, the burden and costs of work for introducing the system are reduced.

In the air conditioning management system according to the second aspect of the present invention, offsite management of the air conditioning units is possible even if the location where the air conditioning units are disposed is off limits to entry and it is not possible to set the real address.

In the air conditioning management system according to the third aspect of the present invention, work for setting the physical address, which is used in communication between the outdoor unit and the indoor unit, is not necessary.

In the air conditioning management system according to the fourth aspect of the present invention, it is not necessary to change a program depending on whether either of the real address or the temporary address is used as the logical address.

In the air conditioning management system according to the fifth aspect of the present invention, it is possible to easily identify whether the real address is set or not set.

In the air conditioning management system according to the sixth aspect of the present invention, the burden and costs of management are reduced.

In the air conditioning management system according to the seventh aspect and the eighth aspect of the present invention, wasteful costs are reduced.

In the air conditioning management system according to the ninth aspect of the present invention, it is possible to reduce the burden of setting the temporary address.

BRIEF DESCRIPTION OF THE DRAWINGS

FIG. 11 is example 2 of a test driving tool screen.

DESCRIPTION OF EMBODIMENTS

An embodiment of an air conditioning management system according to the present invention will be described below with reference to the diagrams.

(1) Overall Configuration (1-1) System Configuration

Figure 1:
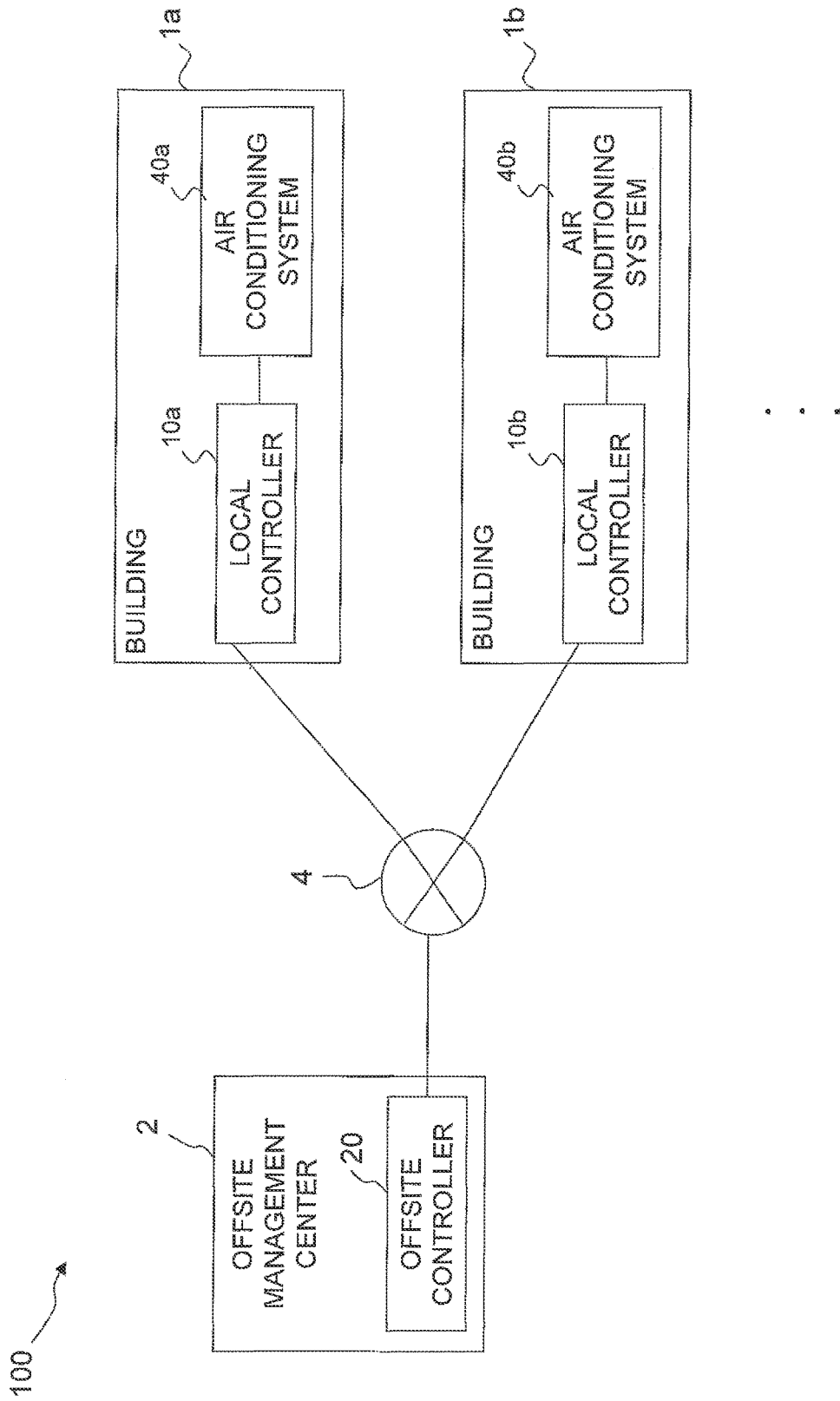
FIG. 1 is an overall configuration diagram of an air conditioning management system.

FIG. 1 is a diagram illustrating an overall configuration of an air conditioning management system 100.

The air conditioning management system 100 is a system for managing a plurality of air conditioning units 50 which are each disposed at a plurality of buildings 1a, 1b, and so on. The buildings 1a, 1b, and so on are in various areas. In each of the buildings, mainly, air conditioning systems 40a, 40b, and so on and local controllers 10a, 10b, and so on are disposed. An offsite controller 20 is arranged at an offsite management center 2 which is a distance from the buildings 1a, 1b, and so on. The local controllers 10a, 10b, and so on manage the air conditioning systems 40a, 40b, and so on in the buildings 1a, 1b, and so on where the local controllers 10a, 10b, and so on are arranged. The air conditioning systems 40a, 40b, and so on are configured from a plurality of the air conditioning units 50 (refer to FIG. 2). The offsite controller 20 is connected to the local controllers 10a, 10b, and so on via a communication network 4 such as the Internet.

Figure 2:
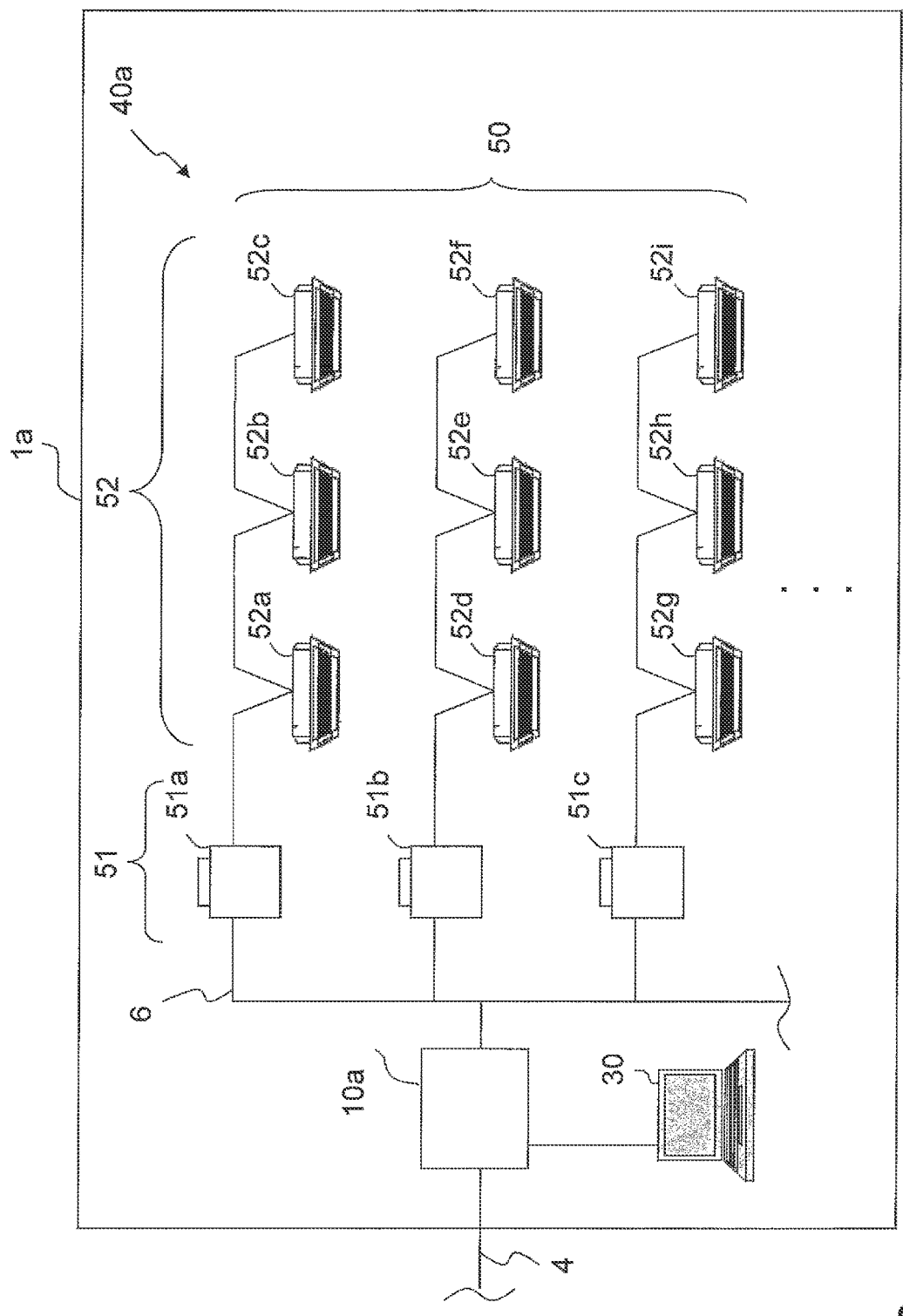
FIG. 2 is a system configuration diagram of a building.

The configuration of the buildings 1a, 1b, and so on will be described next. FIG. 2 is a diagram illustrating the configuration of the building 1a in further detail. The configurations of the buildings 1b and so on are the same as for the building 1a.

As shown in FIG. 2, a plurality of the air conditioning units 50 and the local controller 10a, which is connected to the plurality of air conditioning units 50 using a dedicated air conditioning unit communication wiring 6, are disposed in the building 1a. A plurality of outdoor units 51a, 51b, and 51c (referred to below as outdoor units 51) and a plurality of indoor units 52a, 52b, 52c, 52d, 52e, 52f, 52g, 52h, and 52i (referred to below as indoor units 52) which are connected to the outdoor units 51 using the dedicated air conditioning unit communication wiring 6 are included in the plurality of air conditioning units 50. In the example in FIG. 2, the local controller 10a is connected with each of the outdoor units 51 using the dedicated air conditioning unit communication wiring 6. Here, a test driving work terminal 30, which is connected with the local controller 10a using a communication network 5 such as a LAN, is not a permanent fixture and is used by being carried in by a technician during a portion of test driving work for the air conditioning management system 100 at the building 1a. As such, the test driving work terminal 30 is not represented in FIG. 1.

(1-2) Management Concept

In the air conditioning management system 100, physical addresses 101a are used in controlling the air conditioning units 50 and logical addresses 105a are used separately to the physical addresses 101a in managing the air conditioning units 50. It is possible for a real address 103a and a temporary address 104a which will be described later to be set for each of the air conditioning units 50 and either of these addresses are used as the logical address 105a.

Communication between the outdoor units 51 and the indoor units 52 which is performed in order to control compressors, fans, and the like uses the physical addresses 101a. That is, controlling of the outdoor units 51 and the indoor units 52 is performed using the physical addresses 101a when controlling while the outdoor units 51 and the indoor units 52 are communicating with each other. That is, the outdoor unit 51 identifies the plurality of indoor units 52, with which the outdoor unit 51 is connected, using the respective physical addresses 101a. The physical address 101a is an address which is given to each of the air conditioning units 50 based on serial numbers 102a of print substrates 51p and 52p (refer to FIG. 3) in each of the air conditioning units 50 and is data which is smaller in size than the serial numbers 102a of the print substrates 51p and 52p. The bandwidth of the dedicated air conditioning unit communication wiring 6 which connects between the air conditioning units 50 is very small and communication speed is faster when using the physical address 101a than when using the serial numbers 102a of the print substrates 51p and 52p.

On the other hand, each of the air conditioning units 50 is identified using the logical addresses 105a when managing each of the air conditioning units 50 such as when accumulating driving information for the air conditioning units 50 and detecting abnormalities by analyzing the driving information. This is because the physical addresses 101a of each of the air conditioning units 50, where the print substrates 51p and 52p are replaced due to breakages as will be described later, automatically change to an address which is based on the ordering of the serial numbers 102a of the print substrates 51p and 52p which are new. In this manner, the physical addresses 101a are automatically set and there is a possibility that the corresponding relationship between the physical addresses 101a and the air conditioning units 50 will change even with the air conditioning units 50 where the print substrates 51p and 52p are not replaced. Accordingly, when managing the air conditioning units 50 using the physical addresses 101a, it is necessary that the corresponding relationship is always tracked and the burden and costs of management increase. Therefore, there is a configuration where the logical address 105a is set for each of the air conditioning units 50 separately to the physical address 101a and at least the corresponding relationship between the logical addresses 105a and the air conditioning units 50 where the print substrates 51p and 52p are not replaced does not change. In this manner, the burden and costs of management are reduced due to each of the air conditioning units 50 being identified and managed using the logical addresses 105a.

The address which is used as the logical address 105a is the real address 103a or the temporary address 104a. There is a configuration so that it is possible to set the real address 103a for each of the air conditioning units 50 only by operating a remote control unit 43 while looking at the actual unit. In contrast to this, there is a configuration so that it is possible to arbitrarily set the temporary address 104a via the local controller 10a without operating the remote control unit 43. The temporary address 104a is an address which is sets as an address which is temporary as a substitute in a case where access into the location where the air conditioning units 50 are disposed is not possible due to any circumstances and it is not possible to set the real address 103a using the remote control unit 43. Due to this, it is possible to manage each of the air conditioning units 50 by using the temporary addresses 104a even in a case where the location where the air conditioning units are disposed is off limits for entry during work for introducing the system due to any circumstances and it is not possible to set the real address 103a using the remote control unit 43. Accordingly, the burden and costs of work for introducing the system such as repeat visits by a technician is reduced.

(2) Configuration Details (2-1) Configuration of Air Conditioning Unit

Figure 3:
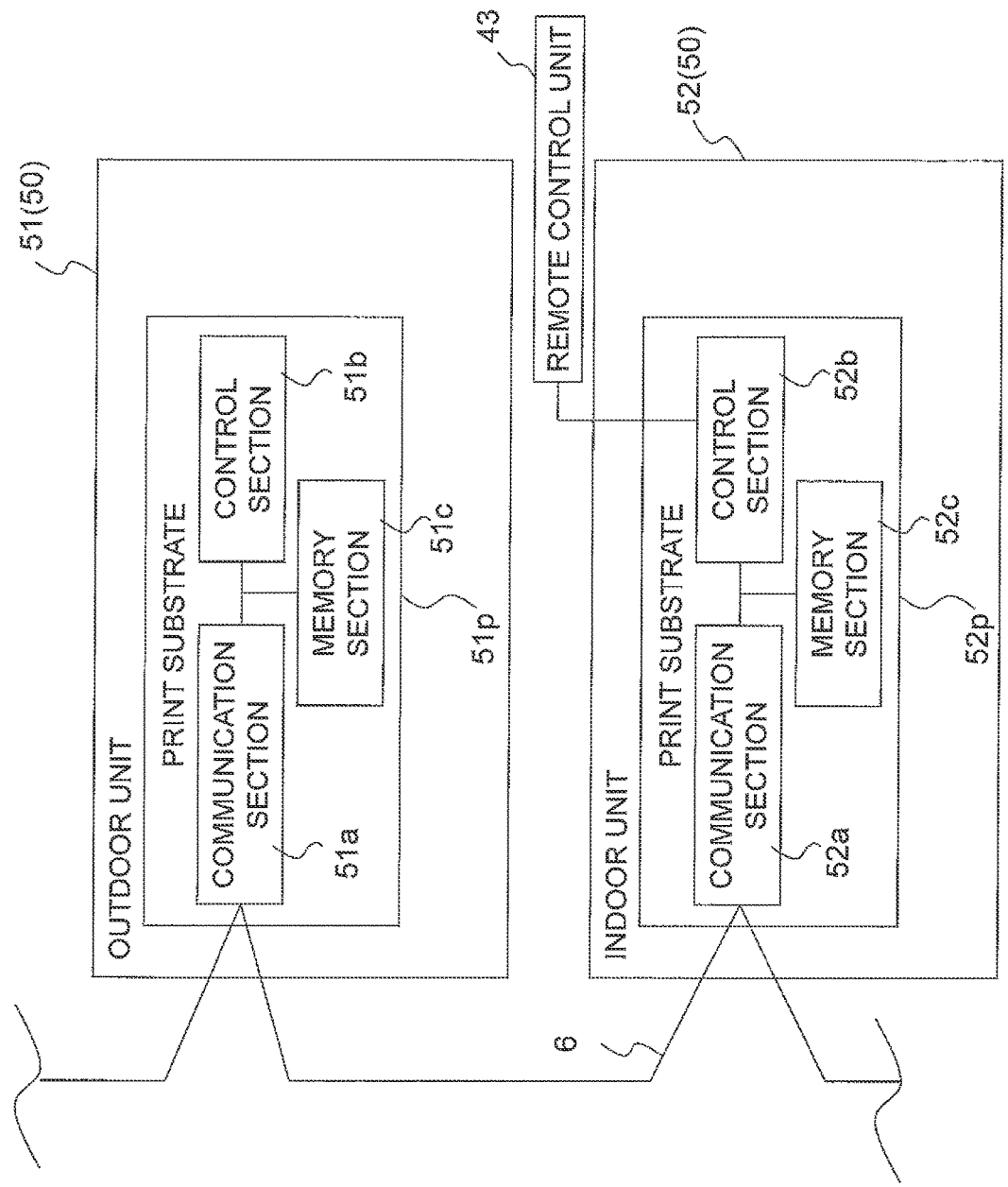
FIG. 3 is a block diagram illustrating a configuration of an outdoor unit and an indoor unit.

The plurality of the air conditioning units 50 in the present embodiment include the outdoor units 51 and the indoor units 52. FIG. 3 is a block diagram which represents this configuration in further detail with the outdoor unit 51 and the indoor unit 52 out of the plurality of air conditioning units 50. The configurations of the outdoor unit 51 and the indoor unit 52 out of the plurality of air conditioning units 50 will be described below with reference to FIG. 3.

The outdoor unit 51 has a compressor, a heat exchanger, an expansion mechanism, a fan, and the like which are not shown in the diagrams and is disposed on the outside of the building 1a. The indoor units 52 has a fan, a heat exchanger, and the like which are not shown in the diagrams and is disposed inside each room in the building 1a. The outdoor unit 51 and the indoor unit 52 are connected using a refrigerant pipe which is not shown in the diagrams and configure a refrigerant circuit. In addition, various types of sensors which are not shown in the diagrams are attached to the outdoor unit 51 and the indoor unit 52. For example, a room temperature sensor which detects the temperature of a room in which the indoor unit 52 is disposed is attached to the indoor unit 52. An outdoor temperature sensor which detects the outdoor temperature, a discharge temperature sensor which detects the discharge temperature which is the temperature of refrigerant at a discharge pipe in the compressor, a discharge pressure sensor which detects the discharge pressure which is the pressure of refrigerant at a discharge pipe in the compressor, a suction pressure sensor which detects the suction pressure which is the pressure of refrigerant at a suction pipe in the compressor, and the like are attached to the outdoor unit 51.

In addition, the outdoor unit 51 and the indoor unit 52 respectively have the print substrates 51p and 52p. The print substrates 51p and 52p are substrates onto which an electrical circuit is printed and respectively have communication sections 51a and 52a, control sections 51b and 52b, and memory sections 51c and 52c.

The communication sections 51a and 52a are interfaces with regard to the dedicated air conditioning unit communication wiring 6, transmit a signal through the dedicated air conditioning unit communication wiring 6 in accordance with commands from the control sections 51b and 52b, receive signals from the dedicated air conditioning unit communication wiring 6, and send signals which represent this to the control sections 51b and 52b.

The control sections 51b and 52b control the actions of the outdoor unit 51 and the indoor unit 52 in accordance with control commands which are input from the manager of the building 1a via the local controller 10a and control commands which are input by a typical user in a room via the remote control unit 43, that is, the control sections 51b and 52b control the actions of each section such as the compressor which is included in the refrigerant circuit.

In addition, the control sections 51b and 52b transmit data which is related to the outdoor unit 51 or the indoor unit 52 to the local controller 10a via the communication sections 51a and 52a. For example, the control sections 51b and 52b transmit values which are detected by the various types of sensors to the local controller 10a as the driving information in predetermined intervals (one minute in the present embodiment). In addition, the control sections 51b and 52b transmit machine numbers, the serial numbers 102a of the print substrates 51p and 52p, product classification codes, the physical addresses 101a and the real addresses 103a which will be described later, and the like to the local controller 10a via the communication sections 51a and 52a. In addition, the control sections 51b and 52b transmit control commands which are input directly, when the control commands are input via the remote control unit 43, to the local controller 10a via the communication sections 51a and 51b.

The memory sections 51c and 52c are, for example, EEPROMs and store the unique serial numbers 102a of each of the print substrates 51p and 52p, product classification codes, machine numbers, the physical addresses 101a and the real addresses 103a, and the like.

(2-2) Configuration of Local Controller

Figure 4:
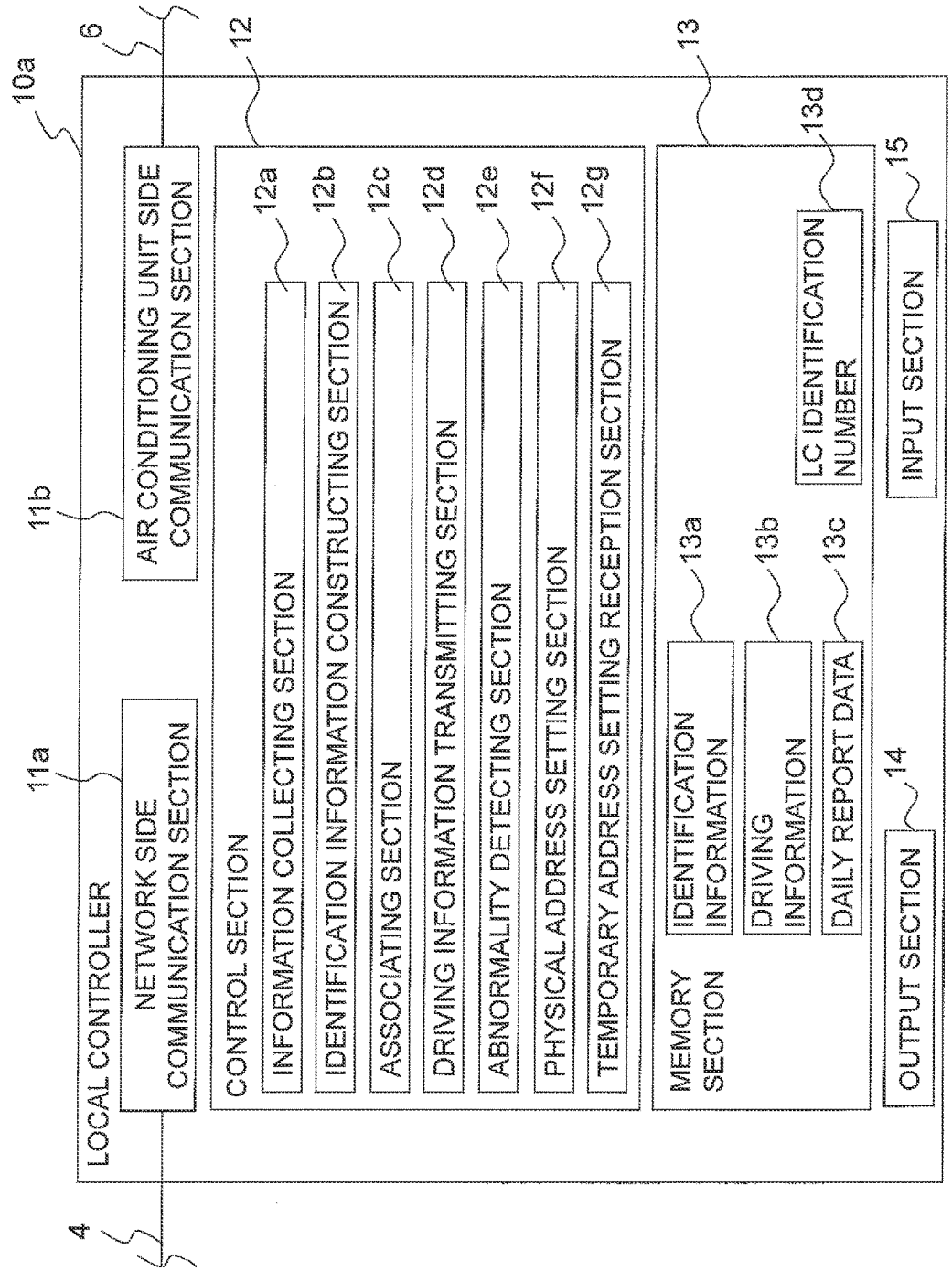
FIG. 4 is a block diagram illustrating a configuration of a local controller.

FIG. 4 is a block diagram illustrating a configuration of the local controller 10a. The configuration of the local controller 10a will be described below. The configurations of the local controllers 10b and so on are the same as for the local controller 10a.

The local controller 10a is disposed in the building 1a, for example, in a management room and manages the plurality of air conditioning units 50 which include the outdoor units 51 and the indoor units 52 described above which are also disposed in the building 1a. In detail, the local controller 10a detects abnormalities in the air conditioning units 50, receives inputting of a driving schedule of the air conditioning units 50, and controls driving of the air conditioning units 50 in accordance with the driving schedule. In addition, the local controller 10a is connected with the communication network 4 which is a wide-area communication network such as the Internet and is connected with the offsite controller 20 in the offsite management center 2 via the communication network 4. In addition, the local controller 10a is also connected to the communication network 5 which is a local communication network such as a LAN in the building 1a.

As shown in FIG. 4, the local controller 10a mainly has a network side communication section 11a, an air conditioning unit side communication section 11b, a control section 12, a memory section 13, an output section 14, and an input section 15.

The network side communication section 11a is an interface with regard to a communication network where an Ethernet (registered trademark) or the like is used and it is possible for the local controller 10a to connect with communication networks such as the Internet or a LAN.

The air conditioning unit side communication section 11b is an interface with regard to the dedicated air conditioning unit communication wiring 6 and is able to connect the local controller 10a with the dedicated air conditioning unit communication wiring 6.

(2-2-1) Control Section

The control section 12 is mainly formed from a CPU and has an information collecting section 12a, an identification information constructing section 12b, an associating section 12c, a driving information transmitting section 12d, an abnormality detecting section 12e, a physical address setting section 12f, and a temporary address setting reception section 12g due to control programs for the local controller 10a being executed.

(a) Information Collecting Section

The information collecting section 12a collects driving information 13b which is transmitted from each of the air conditioning units 50 in predetermined intervals (one minute in the present embodiment). In detail, when the air conditioning unit side communication section 11b receives the driving information 13b which is transmitted from each of the air conditioning units 50 and a signal for notifying this is received from the air conditioning unit side communication section 11b, the information collecting section 12a accumulates and stores the driving information 13b in the memory section 13.

(b) Identification Information Constructing Section

Figure 5:
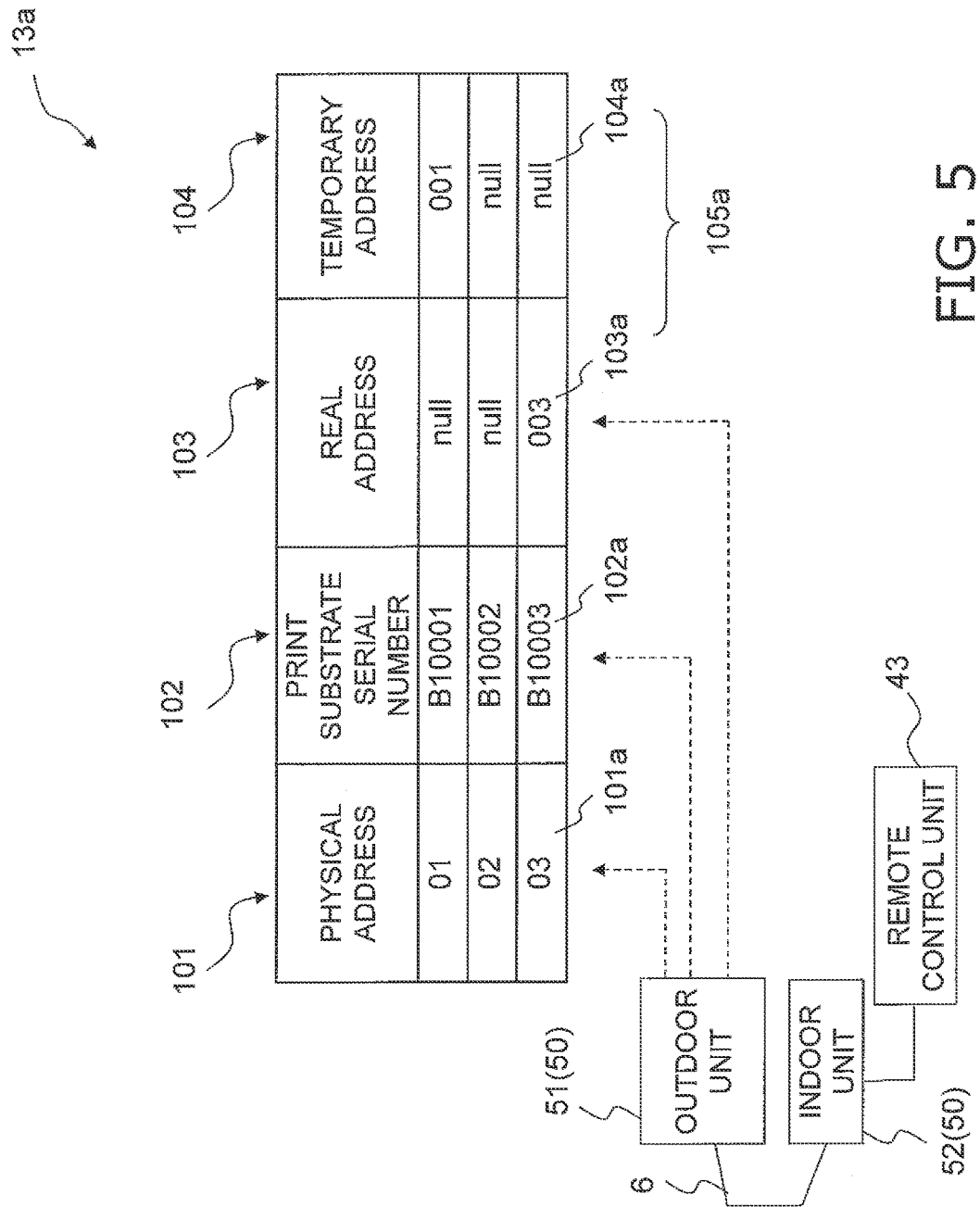
FIG. 5 is a diagram exemplifying identification information.
Figure 6:
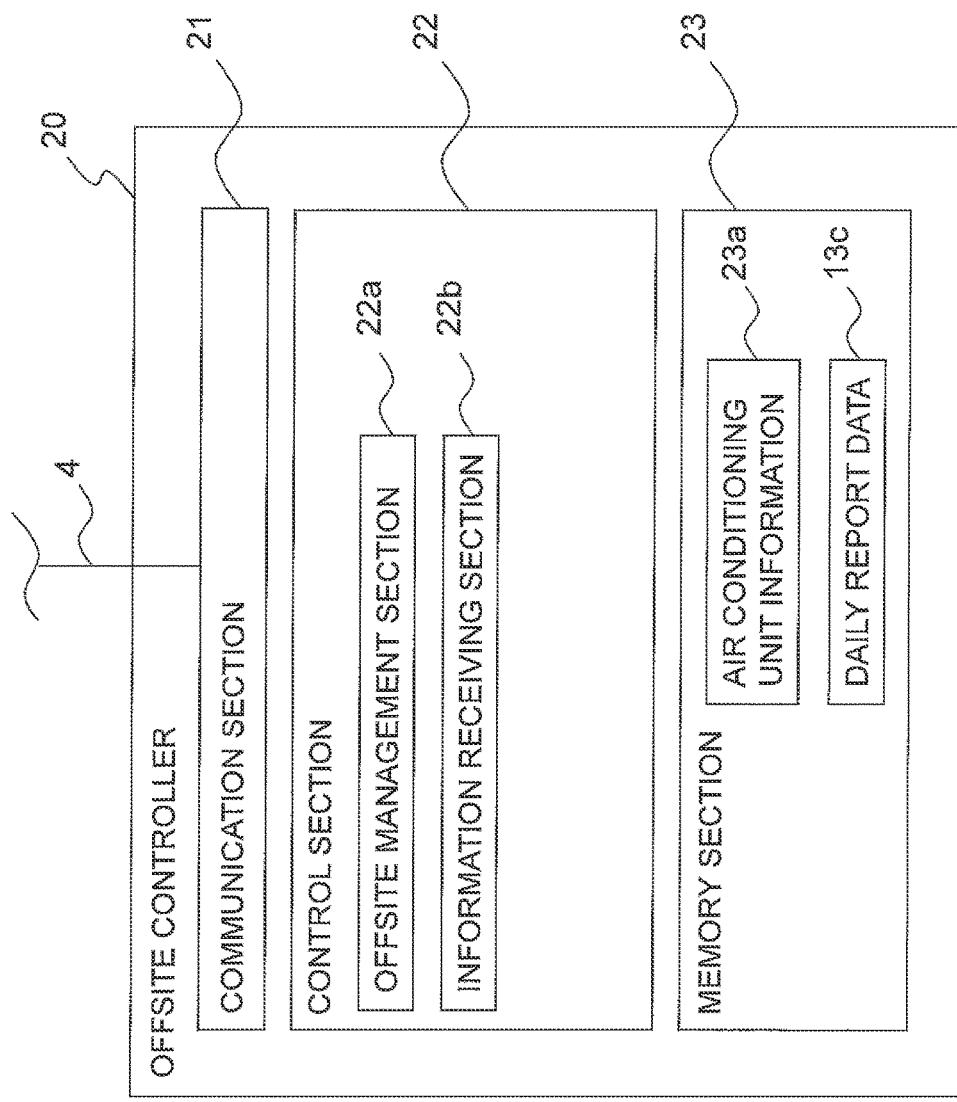
FIG. 6 is a block diagram illustrating a configuration of an offsite controller.
Figure 7:
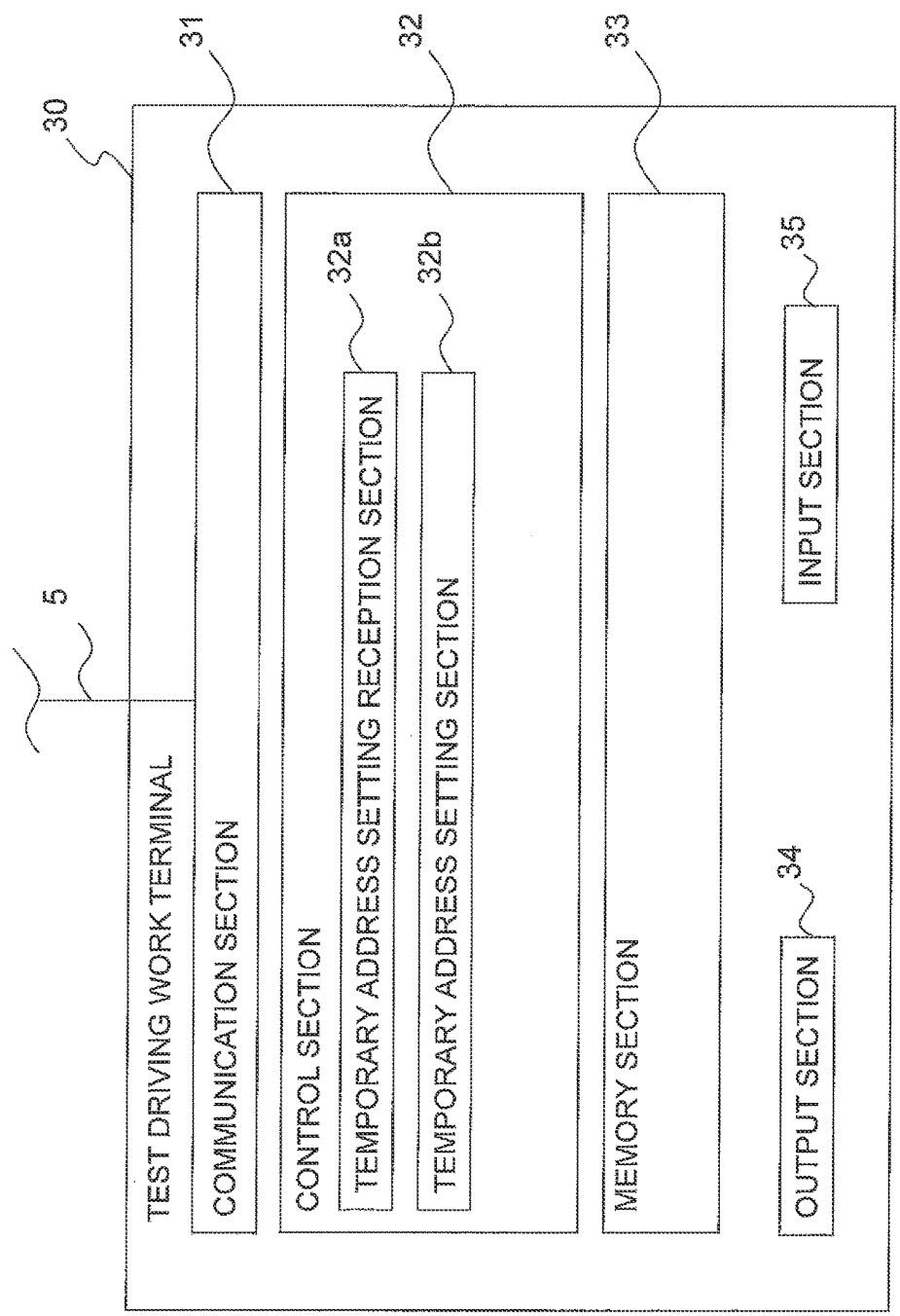
FIG. 7 is a block diagram illustrating a configuration of a test driving work terminal.

The identification information constructing section 12b constructs identification information 13a for each of the air conditioning units 50. The identification information 13a is information as shown in FIG. 5 and is information which is for individually identifying each of the air conditioning units 50. The identification information constructing section 12b first stores the identification information 13a, which is currently in the memory section 13, in the memory section 13 as old identification information. Next, the identification information constructing section 12b transmits a command so that various types of information which are for identifying are transmitted with regard to each of the air conditioning units 50 via the air conditioning unit side communication section 11b. Each of the air conditioning units 50 which receive this command transmits machine numbers, the serial numbers 102a of the print substrates 51p and 52p, product classification codes, the physical addresses 101a, the real addresses 103a, and the like to the local controller 10a. When this information is received via the air conditioning unit side communication section 11b, the identification information constructing section 12b stores this information in the memory section 13 as the identification information 13a.

In addition, in a case where there is old identification information, the identification information constructing section 12b compares the old identification information and the identification information 13a using the serial numbers 12a of the print substrates 51p and 52p and the temporary address 104a which is set for the air conditioning unit 50 in the old identification information is contained in a temporary address section 104 in the identification information 13a which relates to the air conditioning unit 50.

(c) Associating Section

The associating section 12c associates the driving information 13b with the logical addresses 105a. In detail, the associating section 12c creates daily report data 13c which will be described later on the basis of the driving information 13b, searches for the identification information 13a using the physical address 101a of the air conditioning unit 50 where the driving information 13b is added at this time, and specifies the real address 103a or the temporary address 104a of the air conditioning unit 50 which has the physical address 101a. The associating section 12c uses the real address 103a as the logical address 105a in a case where the real address 103a is set and uses the temporary address 104a as the logical address 105a in a case where the real address 103a is not set. Here, the real address 103a is initialized as zero or a null valve and the real address 103a is seen as not being set when the value of the real address 103a is the initial value without any changes. The associating section 12c adds the logical address 105a of each of the air conditioning units 50 to the daily report data 13c which relates to each of the air conditioning units 50.

(d) Driving Information Transmitting Section

The driving information transmitting section 12d transmits the daily report data 13c where the driving information 13b is grouped together as a report to the offsite controller 20 periodically (for example, once a day) via the network side communication section 11a.

(e) Abnormality Detecting Section

The abnormality detecting section 12e determines the presence or absence of abnormalities in each of the air conditioning units 50 based on the driving information 13b which is stored in the memory section 13 at predetermined intervals (one minute in the present embodiment). Here, the abnormality detecting section 12e, where an abnormality is detected, creates abnormality report data and immediately transmits the abnormality report data to the offsite controller 20 through the network side communication section 11a. Here, as classification of abnormalities which are detected by the abnormality detecting section 12e, there are the two types of "abnormality" and "warning". Here, the abnormalities which are classified as an "abnormality" refer to states where the device is faulty and the abnormalities which are classified as a "warning" are states where a fault has not yet occurred but a fault is predicted in the near future.

(f) Physical Address Setting Section

The physical address setting section 12f sets the physical addresses 101a based on the serial numbers 102a of the print substrates 51p and 52p with regard to each of the air conditioning units 50. In detail, for example, the physical address setting section 12f sets a number which is in sequence with the ascending order of the serial numbers 102a as the physical addresses 101a for each of the air conditioning units 50. The physical address setting section 12f transmits the physical addresses 101a, which are set with regard to each of the air conditioning units 50, to each of the air conditioning units 50 via the air conditioning unit side communication section 11b and the physical addresses 101a are stored in the memory sections 51c and 52c in the print substrates 51p and 52p of each of the air conditioning units 50. The process for setting the physical addresses 101a using the physical address setting section 12f is performed each time that the air conditioning system 40a is activated. Accordingly, the ordering of the serial number 102a changes when even just one of the print substrates 51p and 52p of the air conditioning unit 50 is replaced and there is a possibility that the physical addresses 101a of all of the air conditioning units 50 will change.

(g) Temporary Address Setting Reception Section

The temporary address setting reception section 12g receives the setting of the temporary addresses 104a. In detail, for example, the temporary address setting reception section 12g sets the temporary address 104a which is input via the input section 15 for the air conditioning unit 50 which is indicated in the inputting. The temporary address 104a which is set is contained in the temporary address section 104 (refer to FIG. 5) of the identification information 13a which is related to the air conditioning unit 50 which is the target of the setting. In addition, when the temporary address setting reception section 12g receives setting of the temporary addresses 104a with regard to the air conditioning unit 50 which is specified from the test driving work terminal 30 which will be described later via the network side communication section 11a, the temporary address 104a is contained in the temporary address section 104 in the identification information 13a which related to the air conditioning unit 50.

(2-2-2) Memory Section

The identification information 13a, the driving information 13b, the daily report data 13c, and a LC identification number 13d for identifying the local controller 10a are stored in the memory section 13.

(a) Identification Information

FIG. 5 illustrates an example of the identification information 13a. The identification information 13a mainly has a physical address section 101, a serial number section 102, a real address section 103, and the temporary address section 104.

The physical address section 101 contains the physical address 101a.

The serial number section 102 contains the serial numbers 102a of the print substrates 51p and 52p.

The real address section 103 contains the real address 103a which is set from the remote control unit 43.

The temporary address section 104 contains the temporary address 104a which is able to be arbitrarily set without the remote control unit 43.

The physical address 101a is set based on the serial numbers 102a of the print substrates 51p and 52p. The serial numbers 102a of the print substrates 51p and 52p are unique numbers for each of the print substrates 51p and 52p, but these are changed to an address which is formed from, for example, a three digit number.

The real address 103a is an address which is set from the remote control unit 43. A technician inputs the real address 103a by operating the remote control unit 43, the communication sections 51a and 52a of the print substrates 51p and 52p of the air conditioning unit 50 receive the real address 103a when transmitted to the air conditioning unit 50, and the real address 103a which is received by the control sections 51b and 52b is stored in the memory sections 51c and 52c. The real address 103a is an address which is formed from, for example, a three digit number.

The temporary address 104a is an address which is able to be arbitrarily set without the remote control unit. The temporary address 104a is an address with the same format as the real address 103a. For example, if the real address 103a is an address which is formed from a three digit number, the temporary address 104a is also formed from a three digit number and is an address which does not overlap with the real address 103a. In addition, the same format as the real address 103a has the meaning of the same data format and if the real address 103a is, for example, three bits of data, the temporary address 104a is also three bits of data. Accordingly, it is possible to use the same program in cases where either the real address 103a or the temporary address 104a is used as the logical address 105a.

Other than this, although not shown in the diagrams, the identification information 13a has a machine number section which contains the machine number of the air conditioning unit 50, a product classification code section which contains the product classification code of the air conditioning unit 50, and the like.

(b) Driving Information

In addition, the driving information 13b of the air conditioning unit 50, which is collected using the information collecting section 12a, is accumulated and stored in the memory section 13. Here, the memory section 13 is configured so as to be able to store the driving information 13b in predetermined time periods (30 minutes in the present embodiment) and the oldest driving information is sequentially deleted each time that the driving information 13b which is new is acquired when the predetermined period of time is exceeded.

(c) Daily Report Data

In addition, the original data of the daily report data 13c, which is transmitted once a day from the local controller 10a to the offsite controller 20, is stored in the memory section 13. The daily report data 13c is data which groups together the driving history and the driving state of each of the air conditioning units 50 for one day and includes the highest value and the lowest value among values which are detected using the various types of sensors each day, the total operating time of the air conditioning unit 50 each day, and the like. The original data of the daily report data 13c which is stored in the memory section 13 is data being processed before completion of the daily report data 13c which is transmitted to the offsite controller 20 as a final product. The daily report data 13c is processed based on the driving information 13b in predetermined intervals (30 minutes in the present embodiment) and is transmitted to the offsite controller 20 via the network side communication section 11a once a day at a predetermined time. Then, when transmitting of the daily report data 13c to the offsite controller 20 is complete, the daily report data 13c which has been transmitted in the past is deleted from the memory section 13.

(2-2-3) Input Section and Output Section

The output section 14 and the input section 15 are integrally configured as a display with a touch panel function and a speaker function. An input screen, where buttons and the like which receive inputting of control commands with regard to the air conditioning units 50 are lined up, is displayed on the display and, when a manager presses a button, processing which corresponds to the button is executed in the local controller 10a. For example, in a case where turning on of the power supply of the air conditioning unit 50 is selected by the manager by operating a button on the display, a control command, which commands that the power supply of the air conditioning unit 50 is turned on, is transmitted to the control sections 51b and 52b of the air conditioning unit 50 via the air conditioning unit side communication section 11b.

(2-3) Configuration of Offsite Controller

The offsite controller 20 is disposed in the offsite management center 2 and is connected to the local controllers 10a, 10b, and so on in the buildings 1a, 1b, and so on via the communication network 4 such as the Internet.

As shown in FIG. 5, the offsite controller 20 mainly has a communication section 21, a control section 22, and a memory section 23. Here, the offsite controller 20 is a group of computers which is formed from a plurality of server computers in practice and the offsite controller 20 is configured as a whole by these computers working together.

The communication section 21 is an interface with regard to the communication network where an Ethernet (registered trademark) or the like is used and the offsite controller 20 is able to connect with the communication network 4.

The control section 22 is mainly formed from a CPU and has an offsite management section 22a and an information receiving section 22b due to control programs for offsite controller being executed.

The information receiving section 22b receives the logical addresses 105a and the like which are sent from the local controllers 10a, 10b, and so on, information which relates to the air conditioning units 50, and the daily report data 13c which groups together the abnormality report data and the driving information 13b as a report via the communication section 21 and stores this in the memory section 23.

The offsite management section 22a manages the air conditioning units 50 in each area using the logical addresses 105a based on the abnormality report data and the daily report data 13c. In a case where, for example, an abnormality is detected in the air conditioning unit 50, the air conditioning unit 50 is specified using the logical address 105a, and processing for dispatching a technician to the air conditioning unit 50, for example, communicating with the technician using emails is performed. Detailed information which relates to the air conditioning unit 50 which is a problem such as the machine type name and location is acquired by searching air conditioning unit information 23a using the logical address 105a and is notified to the technician.

The memory section 23 is formed from a memory device such as a RAM or a hard disk and stores the air conditioning unit information 23a and the report data 13a. The air conditioning unit information 23a is information which relates to the air conditioning unit 50 such as the logical address 105a, the LC identification number 13d, machine number, product code, machine type name, location (in the case of the indoor unit 52), and refrigerant system (in the case of the outdoor unit 51) and stored information which is transmitted from the local controllers 10a, 10b, and so on.

(2-4) Test Driving Work Terminal

The test driving work terminal 30 is a terminal such as a PC which is used in test driving work and executes a program which is referred to as a test driving tool. The test driving work terminal 30 has a communication section 31, a control section 32, a memory section 33, an output section 34, and an input section 35.

The communication section 31 is an interface with regard to the communication network 5 where an Ethernet (registered trademark) is used.

The memory section 33 is formed from a RAM, a hard disk, or the like and stores a test driving tool program (which is not shown in the diagram) and the like.

The output section 34 is a display such as a LCD.

The input section 35 is a keyboard, a mouse, or the like.

The control section 32 is mainly formed from a CPU. The control section 32 has a temporary address setting reception section 32a and a temporary address setting section 32b when the test driving tool program is executed.

The temporary address setting reception section 32a receives setting of the temporary addresses 104a. In detail, for example, the temporary address 104a, which is input via the input section 35 with regard to the air conditioning unit 50 which is specified, is temporarily stored in the memory section 33 and the temporary address 104a is transmitted to the local controller 10a via the communication section 31.

The temporary address setting section 32b automatically sets the temporary addresses 104a for the air conditioning units 50 based on the physical addresses 101a. For example, a number which is in sequence with the ascending order of the physical addresses 101a in each of the refrigerant systems is set as the temporary address 104a for the air conditioning unit 50 where the real address 103a is not set.

(3) Actions (3-1) Test Driving Work (Using Test Driving Tool)

Figure 8:
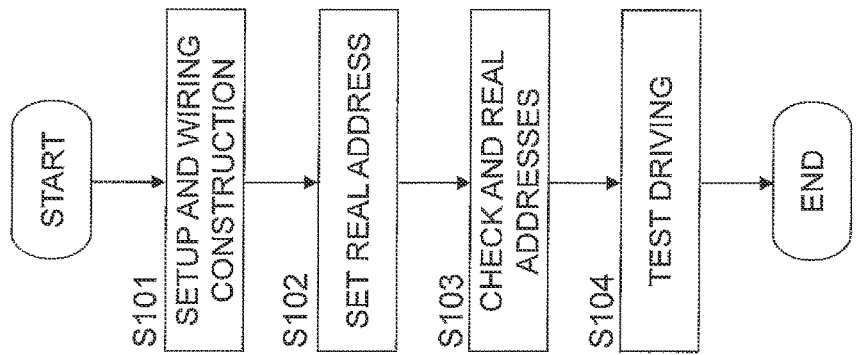
FIG. 8 is a flow chart of test driving work.

The test driving work in the air conditioning management system 100 will be described next using the flow chart in FIG. 8.

In the test driving work, first, necessary construction for setting up and wiring of the devices is performed (step S101). For example, in a case where the air conditioning units 50 have not yet been introduced into a building, setting up of the devices such as the air conditioning units 50 and the local controller 10a, connecting of the local controller 10a to the communication network 4 such as the Internet, wiring the dedicated air conditioning unit communication wiring 6 between the air conditioning units 50 and the local controller 10a, and the like is performed. In a case where the air conditioning units 50 and the local controller 10a have already been introduced, construction for settings and wiring and the like is performed for connecting of the local controller 10a to the communication network 4 such as the Internet. Updating of control programs for the local controller 10a and the like is also performed.

Next, a technician sets the real addresses 103a for each of the air conditioning units 50 (step S102). The technician enters each of the rooms where the air conditioning units 50 are disposed, inputs the real addresses 103a by operating the remote control unit 43, and transmits the real addresses 103a to the air conditioning unit 50. For example, the real address 103a is input with regard to the indoor unit 52 using the remote control unit 43 and the real address 103a, which is transmitted to the memory section 52c of the print substrate 52p of the indoor unit 52, is stored when the real address 103a is transmitted. In this manner, by setting the real addresses 103a using the remote control unit 43 while visually confirming the actual unit, it is possible to associate the real address 103a and the indoor unit 52 which is disposed in a room which is specified. For example, a corresponding relationship between the indoor unit 52 and the real address 103, which is referred to such that "the air conditioners with the real address of 1 is the air conditioner in the meeting room 1 on the first floor", is input from the test driving tool and is stored as the identification information 13a which is in the memory section 13 of the local controller 10a. Here, it is desirable that the real addresses 103a are given to all of the air conditioning units 50, but it is not possible to set the real address 103a for the air conditioning unit 50 in a case where the location where the air conditioning unit 50 is disposed is off limits for entry due to any circumstances.

Next, the technician checks whether the real address 103a is set for all of the air conditioning units 50 and, in a case where there is an air conditioning unit 50 where the real address 103a is not set, setting of the temporary address 104a is performed for the air conditioning unit 50 (step S103). In detail, the test driving work terminal 30 which is carried onsite is connected to the local controller 10a via the communication network 5 such as a LAN, the test work tool in the test driving work terminal 30 is activated and the temporary address 104a is set using the test driving tool. This work will be described later in further detail.

When the real address 103a or the temporary address 104a is set for all of the air conditioning units 50, the technician next performs test driving for the air conditioning management system 100 (step S104). In the test driving, information such as the LC identification number of the local controller 10a, the logical addresses 105a of each of the air conditioning units 50, product classification codes, machine type name, machine number, system name (in the case of the outdoor unit 51), and location (in the case of the indoor unit 52) is transmitted to the offsite controller 20 using the driving information transmitting section 12d of the local controller 10a. The logical address 105a is the real address 103a in a case where the real address 103a is contained in the real address section 103 of the identification information 13a. The real address 103a is seen as not being contained when the value of the real address 103a which is contained is zero or a null value which is the initial value. The logical address 105a is the temporary address 104a which is contained in the temporary address section 104 of the identification information 13a in a case were the real address 103a is not contained. This information is stored in the memory section 23 as the air conditioning unit information 23a in the offsite controller 20 which receives this information.

(3-1-1) Setting Temporary Addresses

Figure 9:
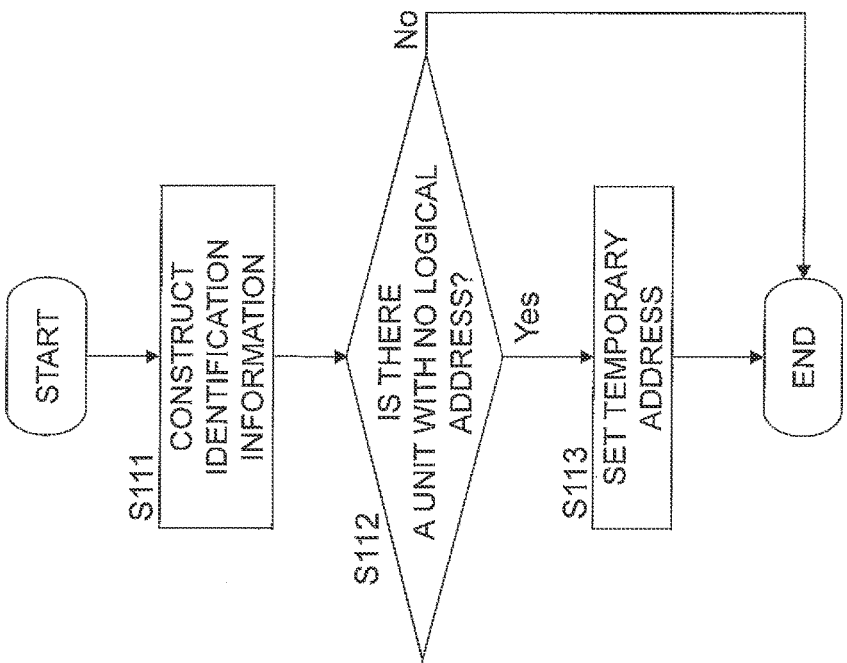
FIG. 9 is a flow chart of address checking and setting work.

FIG. 9 is a flow chart illustrating the work as in step S103 described above in further detail.

First, in step S111, the identification information constructing section 12b constructs the identification information 13a. When a technician presses a button to "start checking" (refer to FIG. 13) which is on the test driving tool screen, an identification information constructing command is transmitted to the local controller 10a. When this command is received using the network side communication section 11a of the local controller 10a, the identification information constructing section 12b stores the identification information 13a which is current in the memory section as the old identification information. Next, the identification information constructing section 12b transmits a command to each of the air conditioning units 50 such that information such as the serial numbers 102a of the print substrates 51p and 52p, the physical addresses 101a, the real addresses 103a, and the machine number is transmitted. The air conditioning units 50 which receives this command transmits this information to the local controller 10a. When the information is received via the air conditioning unit side communication section 11b, the identification information constructing section 12b stores the information in the memory section 13 as the identification information 13a. In addition, in a case where there is the old identification information, the identification information constructing section 12b compares the old identification information and the identification information 13a using the serial numbers 102a of the print substrates 51p and 52p, and the temporary address 104a which is set for the air conditioning unit 50 in the old identification information is contained in the temporary address section 104 of the identification information 13a which relates to the air conditioning unit 50. The content of the identification information 13a is transmitted to the test driving work terminal 30 and is displayed on the test driving tool screen.

Next, in step S112, the technician refers to the content of the identification information 13a which is displayed on the test driving tool screen and checks whether or not there are the air conditioning units 50 where both the real address 103a and the temporary address 104a are not set. In a case where there are the air conditioning units 50 where both the real address 103a and the temporary address 104a are not set, the flow proceeds to step S113. In a case where there are none of the air conditioning units 50 where both the real address 103a and the temporary address 104a are not set, the flow proceeds to step S114.

Figure 10:
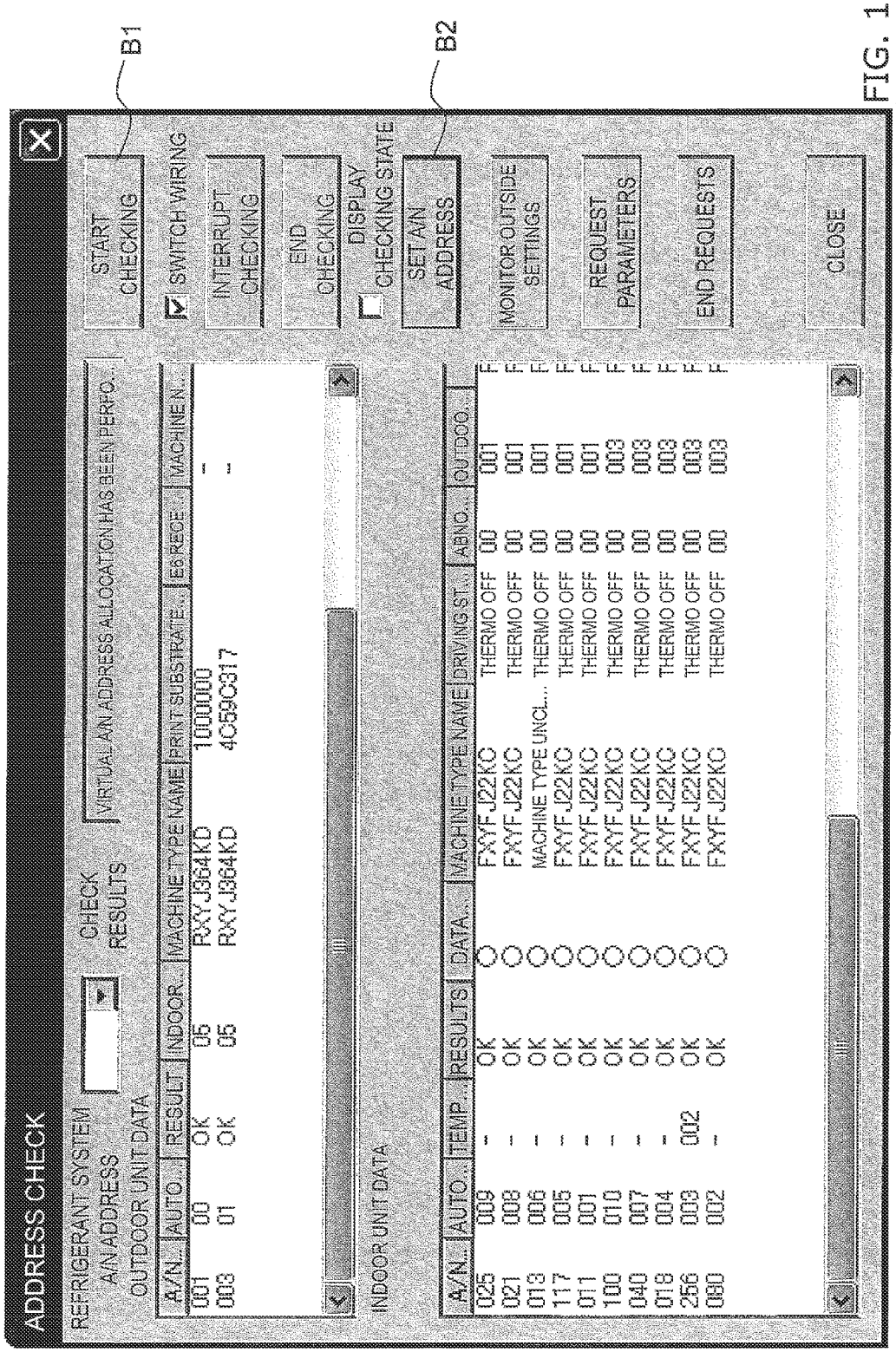
FIG. 10 is example 1 of a test driving tool screen.
Figure 11:
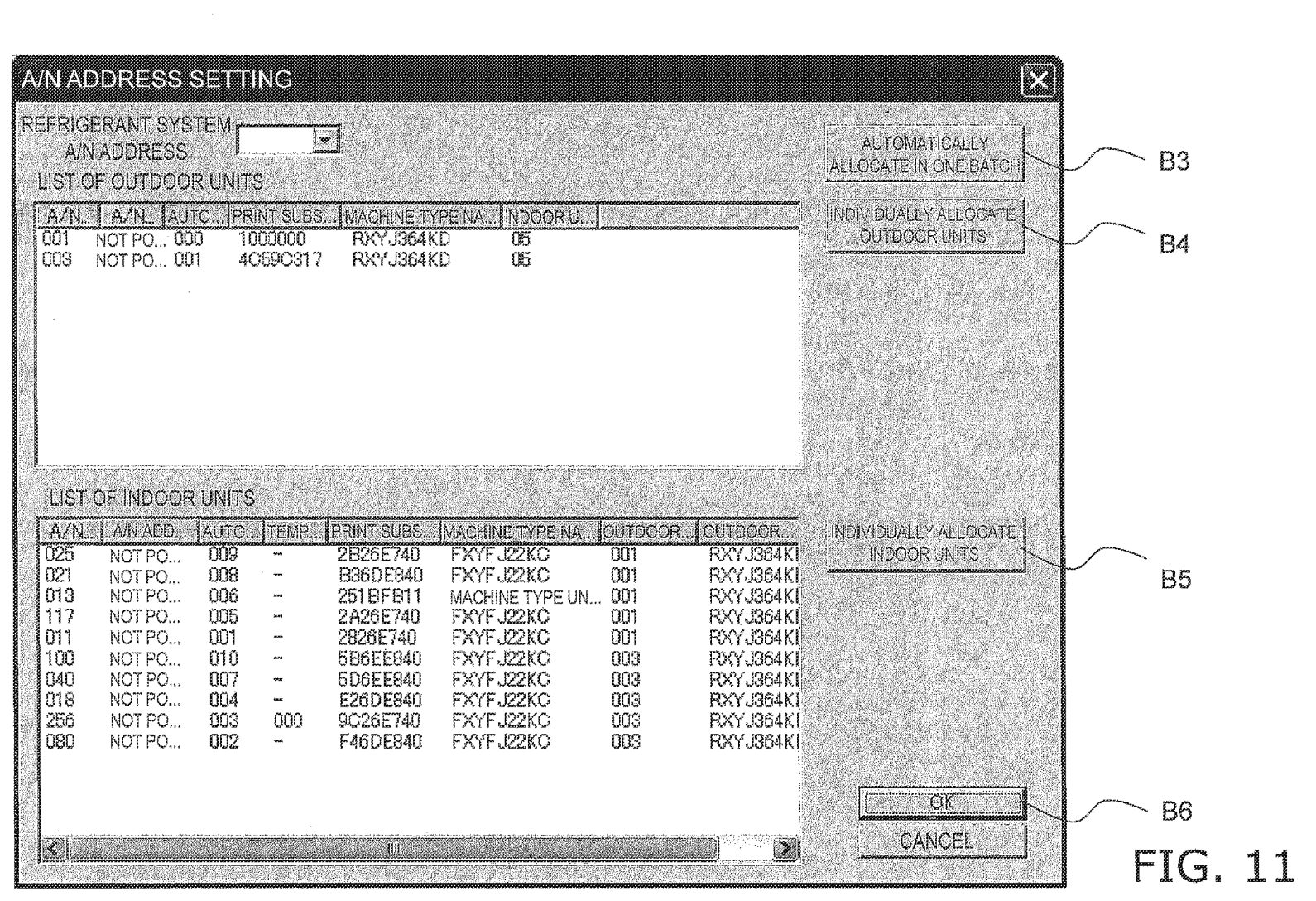
Figure 12:
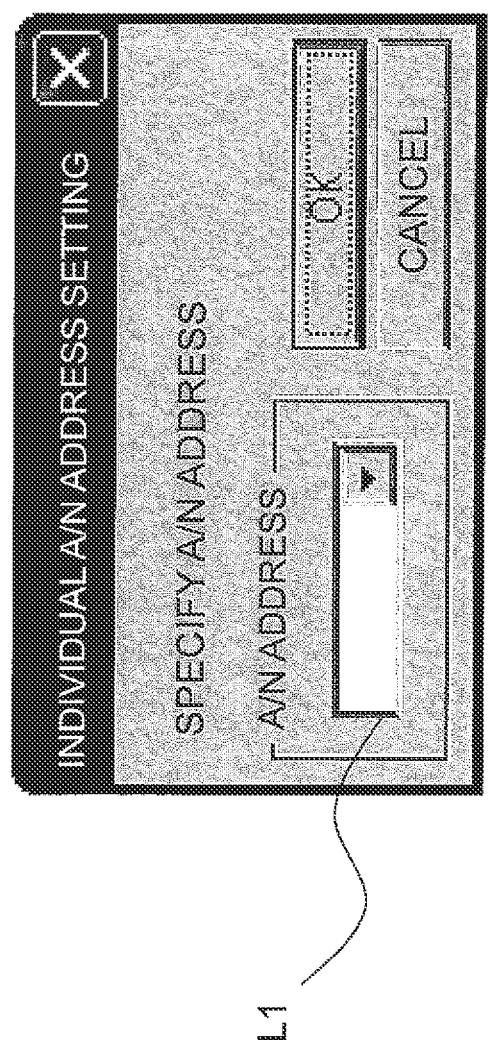
FIG. 12 is example 3 of a test driving tool screen.

Next, in step S113, the technician sets the temporary address 104a with regard to the air conditioning units 50 where both the real address 103a and the temporary address 104a are not set. When the technician presses a button B2 to "set A/N address" (refer to FIG. 10) on the screen, a screen is displayed as shown in FIG. 11. Here, it is possible for the technician to automatically set all of the temporary addresses 104a in one batch or to individually set the temporary addresses 104a. When the technician presses a button B3 to "automatically allocate in one batch" (refer to FIG. 11), the temporary address setting section 32b automatically allocates the temporary addresses 104a based on the respective physical addresses 101a for all of the air conditioning units 50 where both the real address 103a and the temporary address 104a are not set. For example, a number, which is open in the ascending order of the physical addresses 101a in each of the refrigerant systems, is allocated as the temporary address 104a. A number which is open is a number which is not yet allocated to any of the air conditioning units 50 as the real address 103a or the temporary address 104a. Alternatively, when the technician selects the air conditioning units 50 individually by clicking on the screen using a mouse, a button B4 to "individually allocate outdoor units" and a button B5 to "individually allocate indoor units" are enabled. When the technician presses the button B4 to "individually allocate outdoor units" or the button B5 to "individually allocate indoor units", a screen is displayed as shown in FIG. 12. The technician allocates the temporary addresses 104a to the air conditioning units 50 by selecting a number which is open from a pull down list L1 on the screen. Once the temporary addresses 104a are allocated, the screen returns to the screen in FIG. 11 and the temporary addresses 104a which are allocated are transmitted to the local controller 10a when the technician presses the "OK" button B6 and the temporary address setting reception section 12g in the local controller 10a contains the temporary address 104a which is received in the temporary address section 104 of the identification information 13a which relates to the air conditioning unit 50 which is the target for setting the temporary address.

Figure 13:
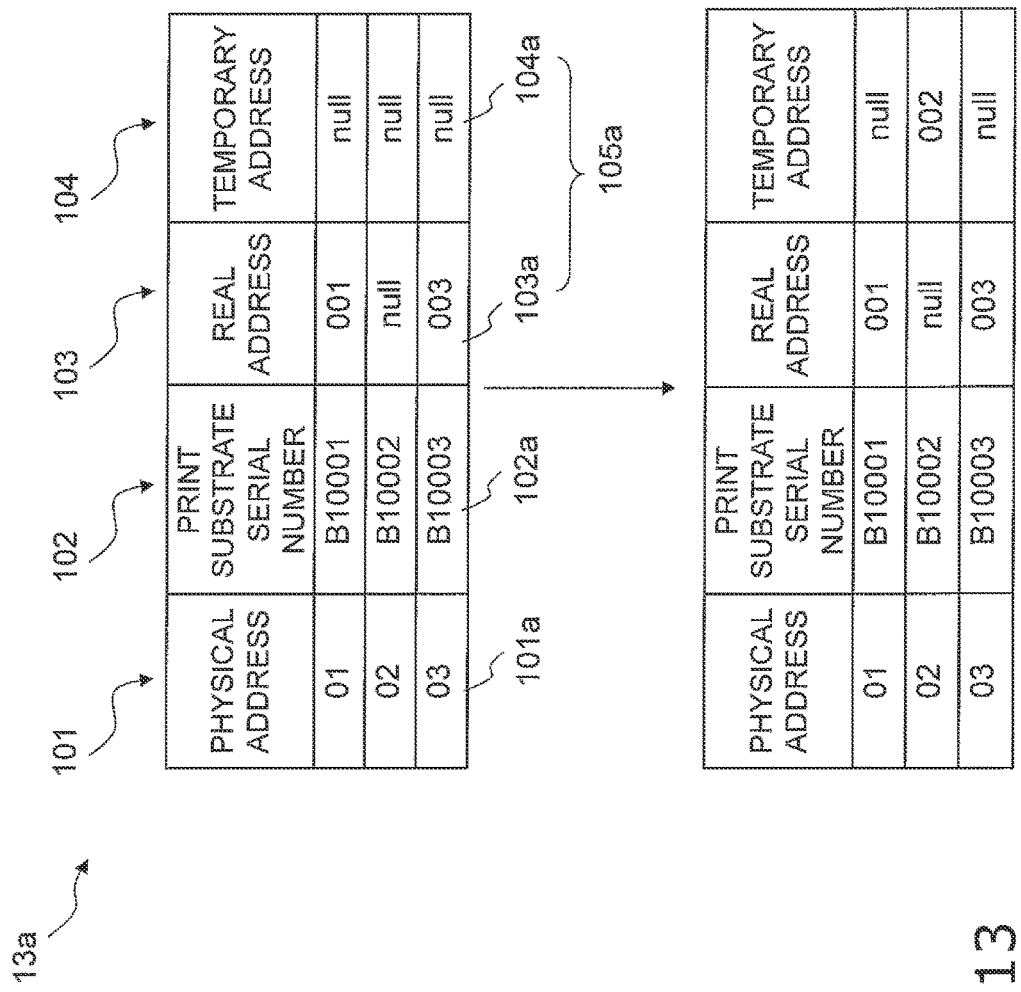
FIG. 13 is a diagram exemplifying changes to identification information in test driving work.

FIG. 13 shows an exemplification of changes to the identification information 13a in the series of work described above. Here, 002 is set as the temporary address 104a for the air conditioning unit 50 where the physical address 101a is 02 and where both the real address 103a and the temporary address 104a are not set.

(3-2) During Monitoring

Next, the actions which are the main activities of the air conditioning management system 100 will be described.

The driving information 13b, which is transmitted from each of the air conditioning units 50 in predetermined intervals (one minute in the present embodiment), is collected using the information collecting section 12a. The driving information 13b which is collected is accumulated and stored in the memory section 13.

The daily report data 13c is processed based on the driving information 13b in predetermined intervals (30 minutes in the present embodiment). At this time, the associating section 12c associates the driving information 13b and each of the air conditioning units 50 using the logical addresses 105a. The daily report data 13c is transmitted to the offsite controller 20 via the network side communication section 11a one a day at a predetermined time.

In addition, in a case where the abnormality detecting section 12e detects an abnormality, the abnormality report data is created and the abnormality report data is immediately transmitted to the offsite controller 20.

The offsite management section 22a of the offsite controller 20 refers to the daily report data 13c which is stored in the memory section 23 and checks the presence or absence of abnormalities or faults and the like. In a case where an abnormality or a fault is detected or in a case where the abnormality report data is received, the offsite management section 22a of the offsite controller 20 searches the air conditioning unit information 23a using the logical addresses 105a, specifies the air conditioning unit 50 which is the problem, and notifies the technician using an email or the like. That is, the offsite management section 22a manages each of the air conditioning units 50 using the logical addresses 105a.

(3-3) Replacing Print Substrates and Removing Indoor Units

Next, work in a case where the print substrates 51p and 52p of the air conditioning unit 50 are replaced or a case where the indoor unit 52 is removed will be described using the flow chart in FIG. 14.

Figure 14:
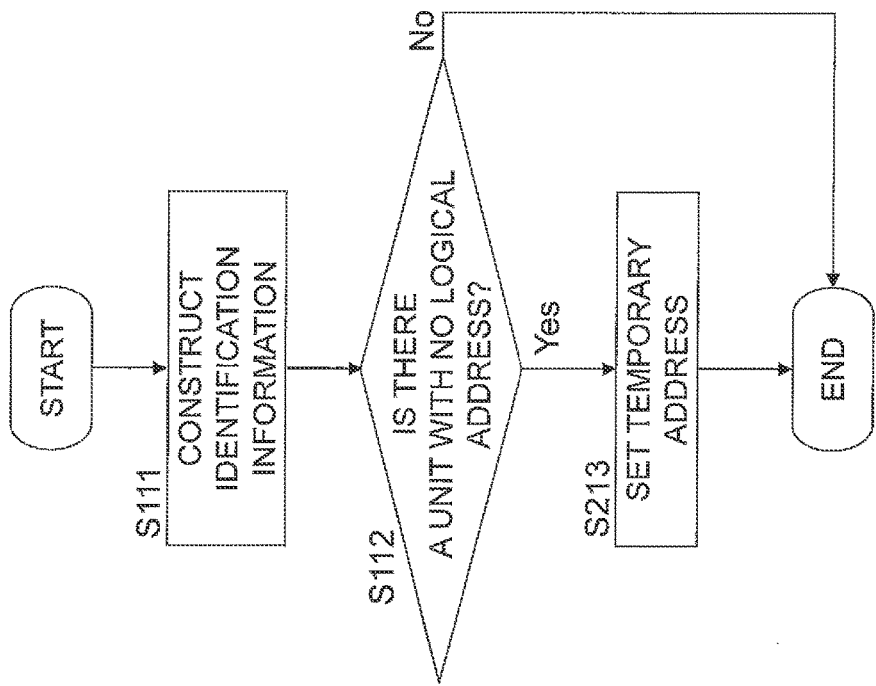
FIG. 14 is a flow chart of work after replacing a print substrate and removing an indoor unit.

In a case where the print substrates 51p and 52p of the air conditioning unit 50 are replaced, first, work which is shown in the flow chart in FIG. 14 is performed after setting of the real address 103a is tested. In a case where the indoor unit 52 is removed, work which is shown in the flow chart in FIG. 14 is performed.

First, identification information is constructed (step S111).

Next, there is checking of whether or not there are the air conditioning units 50 where both the real address 103a and the temporary address 104a are not set (step S112).

Figure 17:
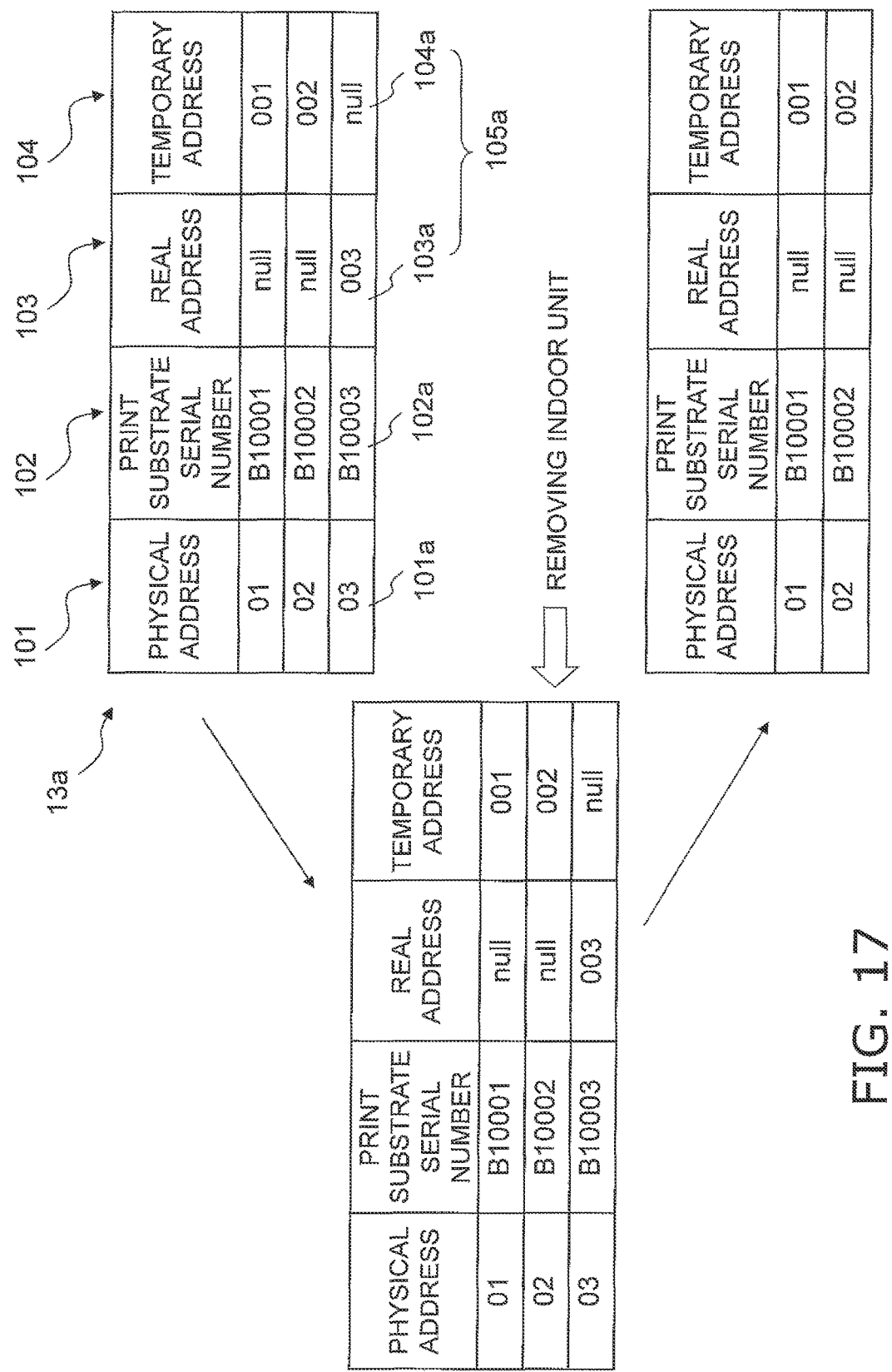
FIG. 17 is a diagram exemplifying changes to identification information when removing an indoor unit.

In a case where there are the air conditioning units 50 where both the real address 103a and the temporary address 104a are not set, the flow proceeds to step S213. In a case where there are none of the air conditioning units 50 where both the real address 103a and the temporary address 104a are not set, the work ends. In a case where the real address 103a is set with regard to the air conditioning unit 50 where the print substrates 51p and 52p are replaced, there should not any of the air conditioning units 50 where both the real address 103a and the temporary address 104a are not set and the work ends. In addition, in a case where the indoor unit 52 is removed, there should not any of the air conditioning units 50 where both the real address 103a and the temporary address 104a are not set as exemplified in FIG. 17 and the work ends.

In step S213, the technician sets the temporary address 104a with regard to the air conditioning units 50 where both the real address 103a and the temporary address 104a are not set. When the technician presses the button B2 to "set A/N address" (refer to FIG. 10) on the test driving tool screen, the screen is displayed as shown in FIG. 11. When the technician selects the air conditioning units 50 individually by clicking on the screen using a mouse, the button B4 to "individually allocate outdoor units" and the button B5 to "individually allocate indoor units" are enabled. When the technician presses the button B4 to "individually allocate outdoor units" or the button B5 to "individually allocate indoor units", the screen is displayed as shown in FIG. 12. The candidates for the temporary address 104a are displayed in the pull down list L1 on the screen. As a result of the control section 32 referring to the old identification information and the identification information 13a which is new and searching for the air conditioning units 50, which have the serial numbers 102a which are not in the identification information 13a, from the old identification information, the candidates for the temporary address 104a are the real address 103a or the temporary address 104a of the air conditioning unit 50 which is a hit. In a case where a plurality of the air conditioning units 50 are hits, a plurality of the candidates for the temporary addresses 104a are displayed. The technician selects one from the temporary addresses 104a which are displayed and allocates the temporary address 104a to the air conditioning unit 50 which is the target for setting the temporary address. Once the temporary address 104a is allocated, the screen returns to the screen in FIG. 11 and the temporary address 104a which is allocated is transmitted to the local controller 10a when the technician presses the "OK" button B6 and the temporary address setting reception section 12g in the local controller 10a contains the temporary address 104a which is received in the temporary address section 104 of the identification information 13a which relates to the air conditioning unit 50 which is the target for setting the temporary address.

Figure 15:
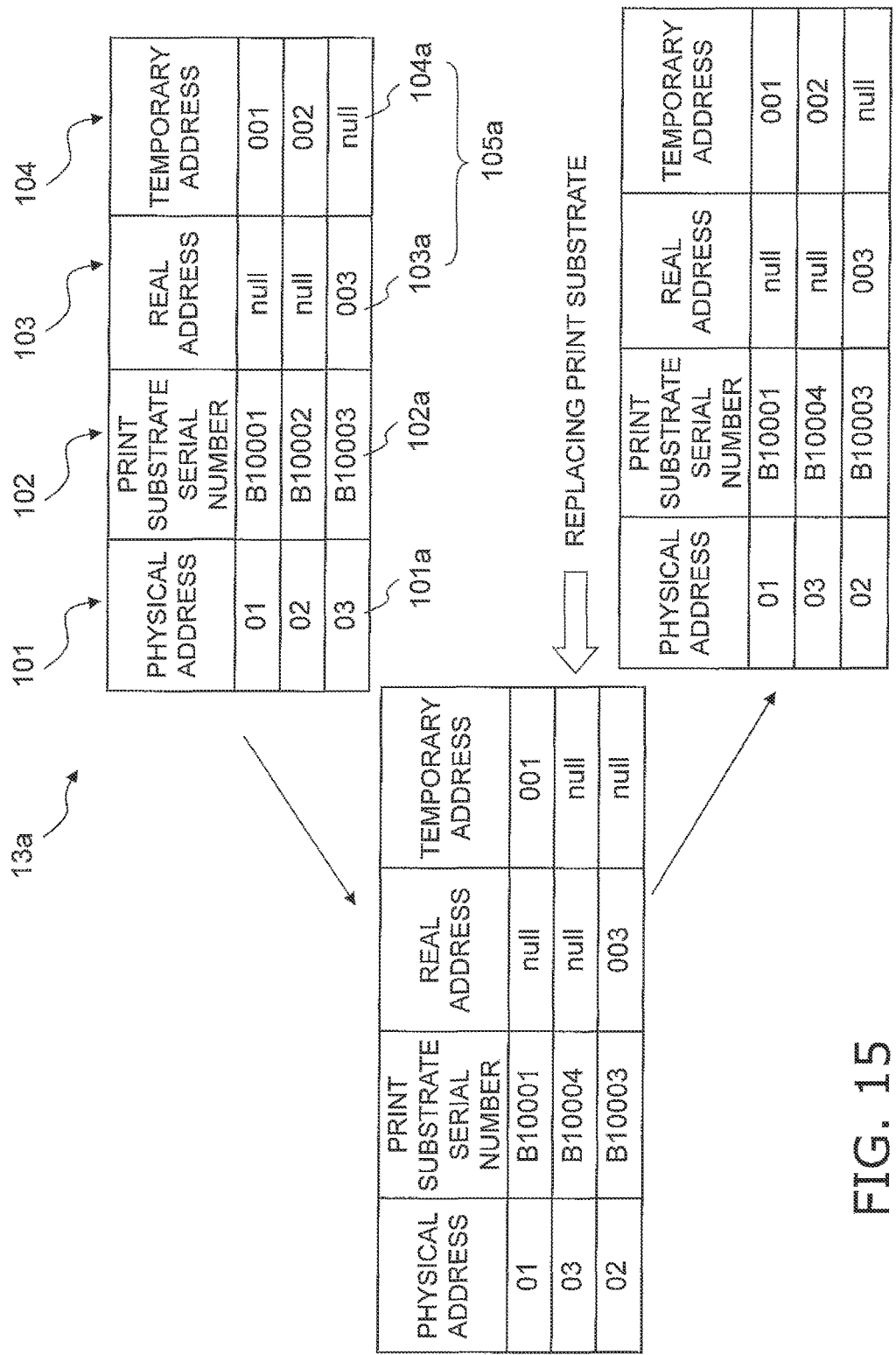
FIG. 15 is a diagram exemplifying changes to identification information when replacing a print substrate.

FIG. 15 shows an exemplification of changes to the identification information 13a in the series of work described above in a case where the print substrates 51ip and 52p of the air conditioning unit 50 are replaced. Here, the print substrates 51p and 52p of the air conditioning unit 50 which is second from the top are replaced and the serial numbers 102a change, and the physical address 101a is automatically set and the physical address 101a which is different is set as a result. For this reason, the temporary address 104a which was set for the air conditioning unit 50 is no longer set. Therefore, the technician set the same temporary address 104a for the air conditioning unit 50 using the test driving tool. Due to this, even when the print substrates 51p and 52p are replaced, the air conditioning unit 50 is recognized by the local controller 10a and the offsite controller 20 as the same as before the replacing of the print substrates 51p and 52p.

(3-4) Adding Indoor Unit

Figure 16:
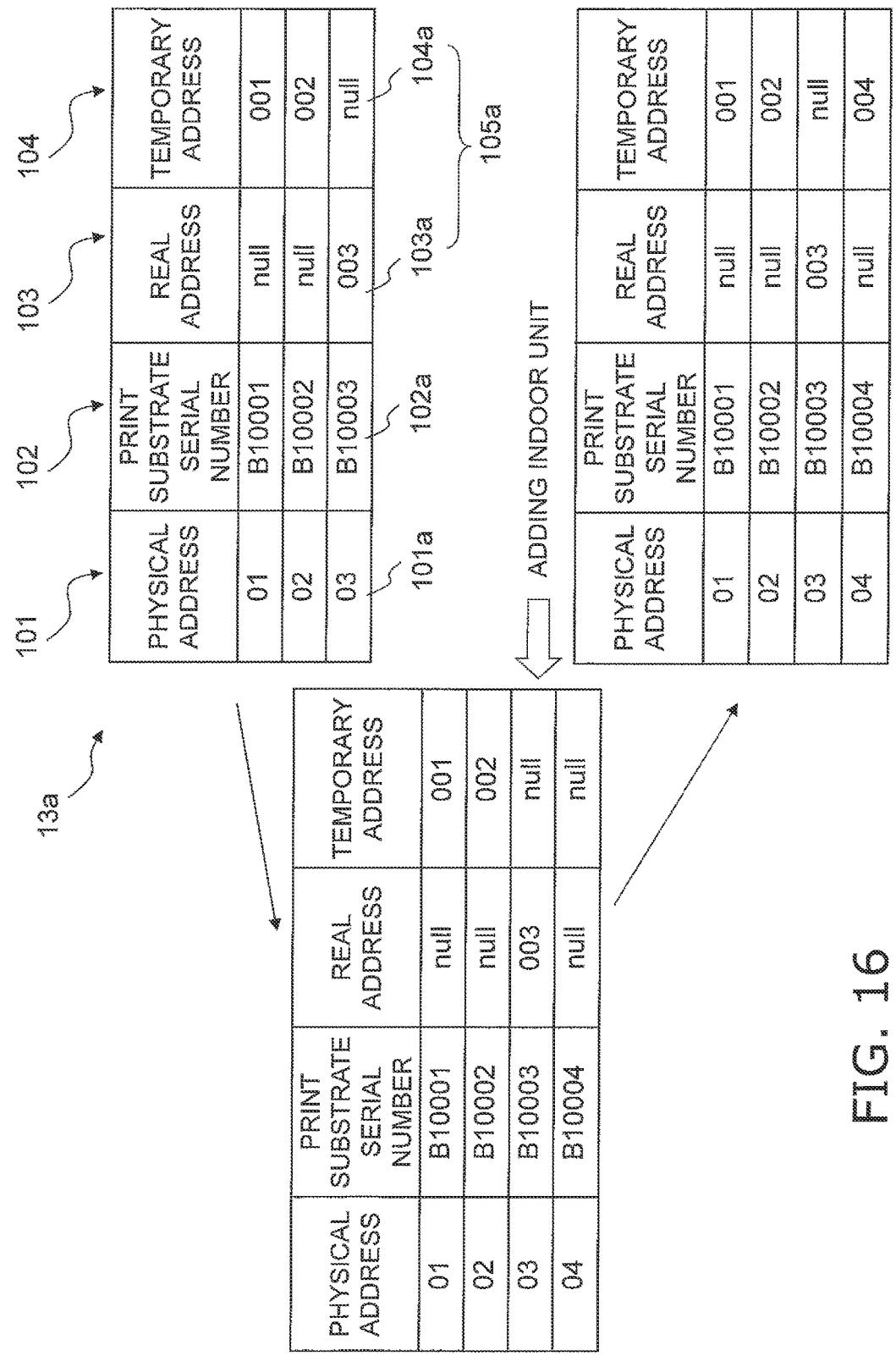
FIG. 16 is a diagram exemplifying changes to identification information when adding an indoor unit.

Next, work in a case where the indoor unit 52 is added will be simply described using FIG. 9 and FIG. 16.

In a case where the indoor unit 52 is added, the same work as the work which is shown in the flow chart in FIG. 9 is performed after setting of the real address 103a with regard to the indoor unit 52 which is added is tested. In a case where it is not possible to set the real address 103a and the temporary address 104a is set as a substitute, an exemplification of the identification information 13a is shown in FIG. 16.

(4) Features (4-1) In the embodiment described above, each of the air conditioning units 50 are managed using the logical addresses 105a separately to the physical addresses 101a which are used in controlling of the air conditioning units 50 such as control of the compressor and the like in the outdoor units 52 and control of the fan and the like in the indoor units 51. Then, the real address 103a, which is set via the remote control unit 43, is used as the logical address 105a, and the temporary address 104a, which is able to be arbitrarily set without the remote control unit 43, is used as the logical address 105a in a case where the real address 103a is not set. Due to this, it is possible to manage each of the air conditioning units 50 using the temporary addresses 104a even in a case where the location where the air conditioning units are disposed is off limits to entry during work for introducing the system due to any circumstances and it is not possible to set the real address 103a using the remote control unit 43. Accordingly, the burden and costs of work for introducing the system such as repeat visits by a technician are reduced.

4-2

In the embodiment described above, the offsite management section 22a manages each of the air conditioning units 50 using the logical addresses 105a.

Due to this, offsite management of the air conditioning units 50 is possible even if the location where the air conditioning units are disposed is off limits to entry and it is not possible to set the real address 103a.

4-3

In the embodiment described above, the physical addresses 101a are automatically set based on the serial numbers 102a of the print substrates 51p and 52p using the physical address setting section 12f. For this reason, work for setting the physical addresses 101a, which is used in communication between the outdoor unit 51 and the indoor unit 52, is not necessary.

4-4

In the embodiment described above, the real address 103a and the temporary address 104a have the same data format. Due to this, it is not necessary to change a program depending on whether either of the real address 103a or the temporary address 104a is used as the logical address 105a.

4-5

In the embodiment described above, the real address 103a has zero or a null value as the initial setting value. Then, the real address 103a is seen as not being set by the associating section 12c when the value of the real address 103a is zero or a null value. Due to this, it is possible to easily identify whether the real address 103a is set or not set.

4-6

In the embodiment described above, the physical addresses 101a of all of the air conditioning units 50 are automatically updated by the physical address setting section 12f when even one of the print substrates 51p and 52p are replaced. After this, when the identification information 13a is constructed by the identification information constructing section 12b, only the physical addresses 101a in the physical address sections 101 is updated and the real addresses 103a and the temporary addresses 104a (the logical addresses 105a) are not changed for the air conditioning units 50 where the print substrates 51p and 52p are not replaced. In addition, with regard to the air conditioning units 50 where the print substrates 51p and 52p are replaced, the real addresses 103a or the temporary addresses 104a which are set before the replacing is set by the technician. Due to this, the burden and costs of management are reduced without changing the corresponding relationship of the logical addresses 105a and the air conditioning units 50.

4-7

In the embodiment described above, it is possible to set the temporary addresses 104a from the local controllers 10a, 10b, and so on even in a case where it is not possible to gain entry into the location where the air conditioning units 50 are disposed and it is possible to manage the air conditioning units 50 using the temporary addresses 104a as the logical addresses 105a. Accordingly, wasteful costs such as repeat visits by a technician are reduced.

4-8

In the embodiment described above, it is possible for a technician to set the temporary addresses 104a from the test driving work terminal 30 which is carried onsite even if it is not possible to gain entry into the location where the air conditioning units 50 are disposed. Accordingly, wasteful costs such as repeat visits by a technician are reduced.

4-9

In the embodiment described above, the temporary address setting section 32b of the test driving work terminal 30 sets the temporary address 104a using the ordering of the physical addresses 101a in each of the refrigerant systems with regard to the air conditioning units 50 where the real address 103a is not set. Due to this, it is possible to reduce the burden of setting the temporary address 104a.

(5) Modified Examples (5-1) Modified Example 1A

In the embodiment described above, the technician activates the test driving tool in the test driving work terminal 30 and performs checking of the logical addresses 105a and setting of the temporary addresses 104a. However, in another embodiment, the test driving tool may be activated in the local controllers 10a, 10b, and so on and checking of the logical addresses 105a and setting of the temporary addresses 104a may be performed. In this case, the control section 12 of the local controller 10a, 10b, and so on has a temporary address setting section.

INDUSTRIAL APPLICABILITY

It is possible for the present invention to be used in offsite management of a plurality of air conditioning units.

What is claimed is:

1. An air conditioning management system configured to execute management of a plurality of air conditioning units using logical addresses, each of the air conditioning units having a physical address that is set based on unique identifying information of the air conditioning unit, the air conditioning management apparatus comprising:
 a local controller that is arranged to communicate with the air conditioning units, the local controller being configured to collect driving information from each of the air conditioning units for executing the management; and
 a plurality of operating units, each of the operating units being provided for a different one of the air conditioning units, each of the operating units being arranged in a vicinity of each one of the air conditioning units, respectively,
 the local controller having
  a memory section configured to store identification information for each of the air conditioning units,
  an information collecting section configured to collect the driving information, and
  an associating section configured to associate the driving information with the air conditioning units using the logical addresses,
 the identification information for each of the air conditioning units having
  a physical address section containing the physical address of the air conditioning unit,
  a real address section containing a real address of the air conditioning unit, the real address being settable from the operating unit, and
  a temporary address section containing a temporary address of the air conditioning unit, the temporary address being settable without using the operating unit when the real address is not set in the real address section,
 the associating section using the real address as the logical address in a case where the real address is set and using the temporary address as the logical address in a case where the real address is not set, and
 the plurality of air conditioning units including an outdoor unit and an indoor unit which communicate with each other using their respective physical addresses.

2. The air conditioning management system according to claim 1, further comprising:
an offsite controller connected to the local controller via a communication network, the offsite controller being configured to manage the plurality of air conditioning units offsite,
the offsite controller having
an information receiving section configured to receive the driving information from the local controller and
an offsite management section configured to manage each of the air conditioning units using the logical addresses.

3. The air conditioning management system according to claim 1, wherein
each of the air conditioning units has a communication substrate, and
the unique identifying information is provided on the communication substrate.

4. The air conditioning management system according to claim 1, wherein
the real address and the temporary address are information with a same format.

5. The air conditioning management system according to claim 1, wherein
the real address has a predetermined initial value, and
the associating section uses the temporary address as the logical address in a case where the real address is the initial value.

6. The air conditioning management system according to claim 3, wherein
the local controller further has an address updating section configured to update only the physical address when the communication substrate is replaced.

7. The air conditioning management system according to claim 1, wherein
the local controller further has a first temporary address setting reception section configured to receive setting of the temporary addresses.

8. The air conditioning management system according to claim 1, further comprising:
a temporary address setting device having a second temporary address setting reception section configured to receive setting of the temporary addresses.

9. The air conditioning management system according to claim 8, wherein
the temporary address setting device further has a temporary address setting section configured to set the temporary addresses based on the physical addresses.

10. The air conditioning management system according to claim 1, wherein
the logical addresses are used to monitor the air conditioning units.

11. The air conditioning management system according to claim 1, wherein
the local controller is configured to store the driving information associated with the air conditioning units using the logical addresses in the memory section.

12. The air conditioning management system according to claim 11, wherein
the information collecting section collects the driving information at predetermined intervals.

13. The air conditioning management system according to claim 2, wherein
the offsite controller is configured to monitor the air conditioning units using the logical addresses.

14. The air conditioning management system according to claim 2, wherein
the local controller is configured to generate report data based on the driving information of each of the air conditioning units and transmit the report data to the offsite controller, and
the offsite controller is configured to store the report data of each of the air conditioning units using the logical addresses.

15. The air conditioning management system according to claim 14, wherein
the offsite controller is configured to check the report data for an abnormality and, when it finds an abnormality, to identify which of the air conditioning units has the abnormality using the logical addresses.

16. The air conditioning management system according to claim 15, wherein
the offsite controller is configured to notify a technician regarding the abnormality.

17. The air conditioning management system according to claim 15, wherein
the abnormality is a fault.

* * * * *